United States Patent [19]
Fukushima

[11] Patent Number: 5,724,447
[45] Date of Patent: Mar. 3, 1998

[54] OPTICAL TRANSFORM SYSTEM FOR THREE-DIMENSIONAL OBJECT RECOGNITION

[75] Inventor: Ikutoshi Fukushima, Hachioji, Japan

[73] Assignee: Olympus Optical Co., Ltd., Tokyo, Japan

[21] Appl. No.: 442,347

[22] Filed: May 16, 1995

[30] Foreign Application Priority Data

| May 17, 1994 | [JP] | Japan | 6-102775 |
| Jun. 22, 1994 | [JP] | Japan | 6-139934 |
| Jan. 31, 1995 | [JP] | Japan | 7-014208 |

[51] Int. Cl.$^6$ ............................. G02B 27/46
[52] U.S. Cl. ............. 382/211; 356/394; 382/152; 382/154
[58] Field of Search ............. 382/106, 141, 382/210, 276, 280, 291, 103, 153, 206, 211, 216, 285, 152, 154; 356/373, 379, 394; 359/29, 561, 11, 36, 41, 559; 395/94; 901/46, 47; 348/91, 94, 139

[56] References Cited

U.S. PATENT DOCUMENTS 5,159,474  10/1992  Franke et al. ................... 359/29

OTHER PUBLICATIONS

K.P. Horn, et al. "The Mechanical Manipulation of Randomly Oriented Parts", Scientific American, vol. 251, No. 2; pp. 100–106, 108, 110, 111, 1984.

Paquet, et al. "Range Image Segmentation using the Fourier Transform", Optical Engineering, Sep. 1993, vol. 32, No. 9, pp. 2173–2180.

*Primary Examiner*—Leo Boudreau
*Assistant Examiner*—Brian P. Werner
*Attorney, Agent, or Firm*—Cushman Darby & Cushman, IP Group of Pillsbury Madison & Sutro LLP

[57] ABSTRACT

An image processing method and apparatus in which a range image of a three-dimensional object is obtained, and the inclination of a plane contained in the range image and an approximate area of the plane are instantaneously detected, thereby realizing high-speed recognition of a three-dimensional object. The apparatus includes a range image obtaining device (401) for obtaining a range image as three-dimensional information about an object, an image display device (402) for displaying the obtained range image as a phase distribution, a Fourier transform optical system (403) which employs approximately parallel coherent light for reading out the image displayed on the image display device, and a Fourier transform lens for carrying out Fourier transformation on the image read out by the coherent light, a Fourier transform spectrum detecting device (404) for detecting a Fourier spectrum image obtained by the Fourier transform optical system, and a recognition device (405) for identifying a three-dimensional object which is to be recognized by comparing the data detected by the detecting device with previously inputted information concerning a reference object, thereby detecting a normal to a plane contained in the obtained range image and an approximate area of the plane at high speed.

17 Claims, 20 Drawing Sheets

FIG. 15 (a)

Laplacian

| 0 | −1 | 0 |
|---|---|---|
| −1 | 4 | −1 |
| 0 | −1 | 0 |

FIG. 15 (b)

Sobel's operator

| −1 | 0 | 1 |
|---|---|---|
| −2 | 0 | 2 |
| −1 | 0 | 1 |

+

| −1 | −2 | −1 |
|---|---|---|
| 0 | 0 | 0 |
| 1 | 2 | 1 |

Normal unit vector
Surface element

Length corresponds
to existence density

OPTICAL TRANSFORM SYSTEM FOR THREE-DIMENSIONAL OBJECT RECOGNITION

BACKGROUND OF THE INVENTION

The present invention relates to an image processing method and an image processing apparatus. More particularly, the present invention relates to a method of and an apparatus for taking out, at high speed, information which may be effectively used for recognition of a three-dimensional object. The present invention also relates to an image processing system that employs the image processing method and apparatus.

There is a strong need for an apparatus which is capable of recognizing a three-dimensional object as seen from various directions, and various studies have been conducted to develop such a three-dimensional object recognizing apparatus for use in various systems, including a visual processing system of an industrial robot, a production inspecting system for an automation line, etc.

Among these object recognition methods, a method in which an extended Gaussian image is employed for recognition is known as an effective method (see Horn, B. K. P., & K. Ikeuchi (1984) "The Mechanical Manipulation of Randomly Oriented Parts", Scientific American, Vol. 251, No. 2, pp. 100–111, August). In the extended Gaussian image, it is first assumed that the surface of a three-dimensional object is covered with surface elements each having a unit area, and a normal unit vector is determined for each surface element. More specifically, FIG. 19(a) shows surface elements and normal unit vectors in the case of a circular cylinder. The hatched portion shown in the figure is one surface element. One normal unit vector is determined for each surface element. As shown in FIG. 19(b), the starting points of all the normal unit vectors are translated to the origin of a Gaussian sphere. As a result, the ending points of these vectors lie on the surface of a sphere (Gaussian sphere) having a unit radius. Further, the ending points of the vectors are weighted according to the existence density of vector ending points, thereby making a mass distribution peculiar to the relevant object on the surface of the Gaussian sphere. In this way, an extended Gaussian image is formed. FIG. 19(c) shows an extended Gaussian image corresponding to the object shown in FIG. 19(a), for example. In the extended Gaussian image, the mass of each vector is represented as the length of a spike which points in the same direction as that of the vector. Since the length of the spike, that is, the mass of the vector, corresponds to the number of unit areas, the total sum of masses corresponds to the area of a surface of the object which has a normal in the pointing direction of the spike.

The use of such an extended Gaussian image enables recognition of an object. For example, an extended Gaussian image of an object to be recognized and each of the extended Gaussian images of various objects, which have previously been obtained, are mathematically rotated in a computer to collate the extended Gaussian images with each other, thereby recognizing the recognition object as identical with an object whose extended Gaussian image is most coincident with the extended Gaussian image of the recognition object. In the collation, the posture of the recognition object can be simultaneously recognized.

In actual practice, as shown in FIG. 20(a), when a circular cylinder 901 is viewed from an observation direction 902, for example, only the hatched portion is observed, and the size of each surface element having a unit area differs from the apparent size according to the angle of inclination of the observation direction 902 and therefore must be corrected. In the case of the circular cylinder 901, if a Z-axis is taken in the direction opposite to the observation direction 902 in FIG. 20(a), and X- and Y-axes are taken as shown in the figure, an extended Gaussian image obtained in this case exists only in a region of Z>0, as shown in FIG. 20(b). That is, in ordinary observation, the observable region is approximately a half of the object 901 to be recognized. For recognition, therefore, extended Gaussian images of various objects which are formed when these objects are observed from various directions have previously been obtained, and are compared with the extended Gaussian image of the object to be recognized. At this time, in the case of an extended Gaussian image, the posture of an object under observation can be roughly determined by utilizing the values of first and second moments calculated from the product of each vector constituting the extended Gaussian image and the mass thereof. Therefore, it is possible to reduce the number of extended Gaussian images used for the comparison to a considerable extent. More specifically, in the case of the extended Gaussian image shown in FIG. 20(b), if the object 901 to be recognized is viewed from the observation direction 902 as shown in FIG. 20(a), the ratio of the visible surface area of the hatched portion of the object 901 to the area of the portion that is projected on the XY-plane in the visible coordinate system (X,Y,Z), that is, the projection ratio, is uniform regardless of the posture in which the object 901 is viewed by the observer. Accordingly, when an extended Gaussian image for collation is largely different in the projection ratio from the extended Gaussian image of the object to be recognized, collation need not be carried out in more detail for this extended Gaussian image. Further, as the image rotates, the direction 903 of the least second moment in the image rotates accordingly. Therefore, when the image illustrated in FIG. 20(b) is to be compared with an image obtained as the illustrated image is rotated, it is only necessary to make the axial directions of the least moments coincident with each other. In other words, whatever posture the observer assumes when viewing the object 901 to be recognized, if the comparison is made with the least moment direction 903 matched with a specific axis (e.g., the X-axis in FIG. 20(b)), the object 901 need not be compared with every image of an extended Gaussian image for collation that is obtained by rotating it variously. In this way, it is possible to reduce considerably the number of extended Gaussian images to be compared in detail (see Katsushi Ikeuchi "A Technique for Determining Observation Direction from Chestnut-Bur Representation Image of Object Based on Extended Gaussian Image", Journal of the Japan Society of Electronic Communication, May 1983, Vol. J66-D, pp. 463–470).

As has been described above, the use of an extended Gaussian image is effective and advantageous, but it is necessary, in order to obtain an extended Gaussian image, to divide an image containing the object to be recognized into surface elements, obtain a normal vector for each surface element, and further obtain a vector existence density.

Accordingly, the conventional method, in which the computations for obtaining an extended Gaussian image are carried out one by one on a computer, requires an enormously long time; this is the greatest obstacle to the achievement of high-speed recognition.

SUMMARY OF THE INVENTION

In view of the above-described problems of the conventional technique, an object of the present invention is to provide an image processing method and apparatus in which a range image of a three-dimensional object is obtained, and the inclination of a plane contained in the range image and an approximate area of the plane are instantaneously detected, thereby realizing high-speed recognition of a three-dimensional object, and also to provide an image processing system that employs the image processing method and apparatus.

To attain the above-described object, the present invention provides an image processing apparatus which has the following constituent elements, as shown in the block diagram of FIG. 1: a range image obtaining device 401 for obtaining a range image as three-dimensional information about an object; an image display device 402 for displaying the obtained range image as a phase distribution; a Fourier transform optical system 403 which employs approximately parallel coherent light for reading out the image displayed on the image display device 402, and a Fourier transform lens for carrying out Fourier transformation on the image read out by the coherent light; a Fourier transform spectrum detecting device 404 for detecting a Fourier spectrum image obtained by the Fourier transform optical system 403; and a recognition device 405 for identifying a three-dimensional object which is to be recognized by comparing the data detected by the detecting device 404 with previously inputted information concerning a reference object. Thus, the image processing apparatus is capable of recognizing a three-dimensional object which is to be recognized at high speed.

Another image processing apparatus of the present invention for realizing the above-described image processing method has the following constituent elements, as shown in the block diagram of FIG. 4: an object information obtaining device 1403 having at least a range image obtaining device 1401 for obtaining a range image as information concerning an object; a first image display device 1402 for displaying the obtained range image as a phase distribution; a region extracting device 1404 for dividing the object information obtained into regions and extracting a region from the divided regions; a second image display device 1405 for displaying the region extracted by the region extracting device 1404 as intensity information; approximately parallel coherent light for reading out the images displayed on the first and second image display devices 1402 and 1405; a Fourier transform device 1406 for carrying out Fourier transformation on the images read out by the coherent light; and a detecting device 1407 for detecting a Fourier spectrum image obtained by the Fourier transform device 1406. Thus, the image processing apparatus is capable of detecting at high speed a normal to a plane contained in the object image obtained and also an approximate area of the plane.

In this case, the image processing apparatus may be arranged such that the detecting device 1407 includes a filtering device which is capable of intensity modulation.

The image processing apparatus may further have a recognition device 1408, whereby a three-dimensional object to be recognized can be recognized at high speed.

The details of the present invention will be described below. For example, it is assumed that, as shown in FIG. 2, a plane 1 which constitutes a three-dimensional object is given by $z(x,y)=ax+by+c$ in a coordinate system $(x,y,z)$ in which the z-axis is taken in the direction opposite to the direction of the observer's line of sight, and that the plane 1 is projected on a region $g(x,y)$ of a plane 2 which is perpendicular to the direction of the observer's line of sight. The range image of the three-dimensional object may be expressed as a phase distribution, i.e., $\exp(iz(x,y))$, by using the method of the present invention. If the phase distribution is subjected to Fourier transformation, a Fourier transform image is obtained as follows:

$$F(e^{iz(x,y)}) = \int_{-\infty}^{\infty}\int_{-\infty}^{\infty} g(x,y)\exp(iz(x,y))\exp(-2\pi i(\xi x + \eta y))dxdy$$

$$= \int_{-\infty}^{\infty}\int_{-\infty}^{\infty} g(x,y)\exp(i(ax+by+c))\exp(-2\pi i(\xi x + \eta y))dxdy$$

$$= e^{ic}\int_{-\infty}^{\infty}\int_{-\infty}^{\infty} g(x,y)\exp\{-2\pi i((\xi - a/2\pi)x + (\eta - b/2\pi)y)\}dxdy$$

$$= e^{ic}G(\xi - a/2\pi, \eta - b/2\pi)$$

where $G(\xi,\eta)$ represents the Fourier transform of $g(x,y)$.

In other words, it is possible to obtain an image in which the Fourier transform information of a region $g(x,y)$ having a predetermined inclination has shifted by $(\xi,\eta)=(a/2\pi, b/2\pi)$. Since the center of the Fourier transform information has a strong peak corresponding to the area of the transform region (the region having a predetermined inclination in this case), the peak point can be detected. Accordingly, it is possible to detect the inclination of the plane 1 and an approximate area thereof by detecting the point of the strong peak and the intensity at the peak in the Fourier transform plane.

The image which has been subjected to the above-described processing is equivalent to an image which is obtained by projecting the vector $(l,m,n)$ constituting the aforementioned extended Gaussian image onto the plane of $Z=-1$. Accordingly, various features of the extended Gaussian image can be utilized as they are.

More specifically, range image data that is obtained by the range image obtaining device may be displayed on the image display device in the form of a phase distribution, and the displayed image may be subjected to Fourier transformation by an optical process using a Fourier transform lens. By doing so, the above-described technique can be realized as a high-speed recognition system. If it is assumed that the focal length of the Fourier transform lens is f, the wavelength used is $\lambda$, and the coordinates on the Fourier transform plane is $(x',y')$, then $\xi=x'/f\lambda$, and $\eta=y'/f\lambda$. Accordingly, a strong peak appears at the point given by $x'=f\lambda a/2\pi$, $y'=f\lambda b/2\pi$ (1)

As one example, let us assume that the focal length f of the Fourier transform lens is f=1,000 mm, and the reconstructing wavelength is $\lambda$=632.8 nm, and let us carry out simulation of Fourier transformation using a Fourier transform optical system with respect to a phase distribution image which is 10 by 10 mm square, as shown in FIG. 3(a), and which contains a quadrangular pyramid composed of planes given by:

| f(x, y) | = | −10x −10y +20π | (x ≥ 0, y ≥ 0) |
|---|---|---|---|
| | | −10x + 10y + 20π | (x ≥ 0, y < 0) |
| | | 10x − 10y + 20π | (x < 0, y ≥ 0) |
| | | 10x + 10y + 20π | (x < 0, y < 0) |

As a result, a Fourier spectrum image such as that shown in FIG. 3(b) is obtained. Regarding inclination, there are 4 points in this case, i.e., (a, b)=(10, 10), (10, −10), (−10, 10), and (−10, −10). Points on the Fourier spectrum plane which correspond to the above points are found to be (1 mm, 1 mm), (1 mm, −1 mm), (−1 mm, 1 mm), and (−1 mm, −1 mm), respectively, from the expression (1), and it is found that there is a peak at each point. Further, the peak values at these points are approximately equal to the peak value at the center of a Fourier transform image of an aperture which is 5 by 5 mm square. Therefore, it is found that an area which is close to being 5 by 5 mm square is present in the image. Since these points and the intensities can be instantaneously detected, it is possible to instantaneously know the inclination of a plane constituting the object to be recognized and also an approximate area of the plane. Accordingly, the time required for recognition reduces to a considerable extent, and it becomes possible to recognize a three-dimensional object at high speed.

Incidentally, although the above-described image processing method is an effective method, since Fourier transformation is carried out over the whole range of the image obtained, information concerning objects other than the object to be recognized, such as a background contained in the range image, may be superimposed on the information concerning the recognition object, and it is therefore necessary to carry out processing for removing such undesired information.

In the area information obtained, since the light intensity is measured only for the area of the orthogonally projected image of the portion that is actually observed, it is necessary, in order to obtain the actual surface area, to correct the light intensity obtained for each pixel. In actual practice, there are many cases where recognition can be made only with information concerning the inclination of a plane. However, when a higher level of recognition is required, there is a need for information about the surface area corrected for the light intensity obtained for each pixel. It is possible to make such correction by using software, as a matter of course. However, the use of software interferes with the high-speed recognition.

Therefore, according to another aspect of the present invention, a specific object to be recognized which is contained in the range image obtained is selected, and the inclination of a plane constituting the object and an approximate area of the plane are instantaneously detected with high accuracy without the required information being intermingled with other information.

More specifically, in the arrangement shown in FIG. 4, the inclination of a plane constituting the object to be recognized which is present in the range image obtained by the range image obtaining device 1401, together with an approximate area of the plane, can be obtained at high speed without receiving information concerning a background or other object.

Further, the image processing apparatus may be arranged such that the detecting device 1407 includes a filtering device which is capable of intensity modulation. With this arrangement, a filter, in which the transmittance changes so that the way in which the object of observation is seen corresponds to the actual area of the object, is provided immediately in front of the image showing an inclination and an area, which is obtained by the apparatus shown in FIG. 4. Therefore, it is possible to realize high-speed recognition.

More specifically, if a plane of $z(x,y)=ax+by+c$ is present in the range image, and a Fourier transform lens with a focal length f is used, a peak occurs at a position $(f\lambda a/2\pi, f\lambda b/2\pi)$ proportional to $(a, b)$ of the vector component showing a normal on the detecting plane. The light intensity obtained at that time corresponds to the area of the orthogonally projected image of the plane being observed, and this area is $1/(a^2+b^2+1)^{1/2}$ times the actual surface area. Therefore, a filter in which the transmittance changes at $(a^2+b^2+1)^{1/2}$, that is, a filter in which the transmittance changes at $\{(2\pi x/f\lambda)^2+(2\pi y/f\lambda)^2+1\}^{1/2}$ with respect to the position of a certain point $(x, y)$, is disposed immediately in front of the detecting plane. By doing so, a surface area can be instantaneously obtained without the need of successively performing computation for the correction of the area obtained by orthogonal projection.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIGS. 15(a) and 15(b) show an example of a weight table used in a filter for region division in the seventh embodiment.

DESCRIPTION OF THE PREFERRED EMBODIMENTS

Some embodiments of the image processing method and apparatus according to the present invention will be described below with reference to the accompanying drawings.

[First Embodiment]

Figure 1:
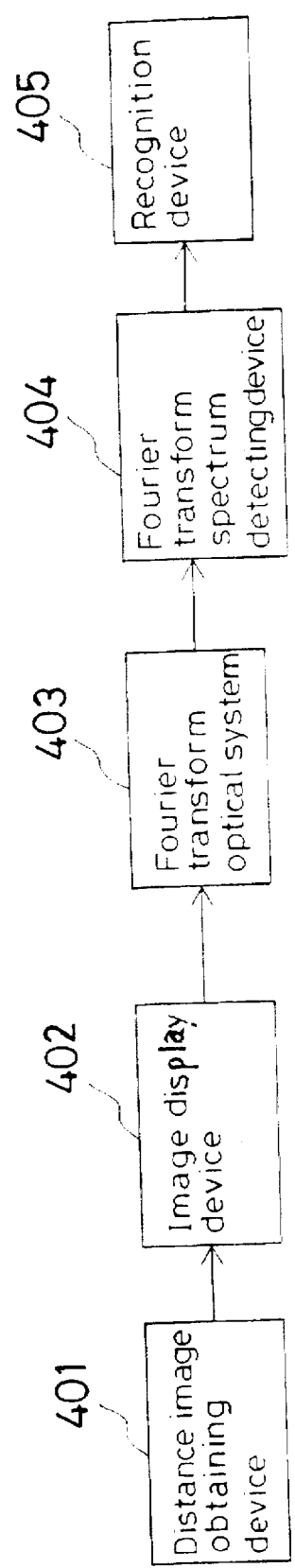
FIG. 1 is a block diagram showing the arrangement of an apparatus for realizing the image processing method of the present invention.
Figure 2:
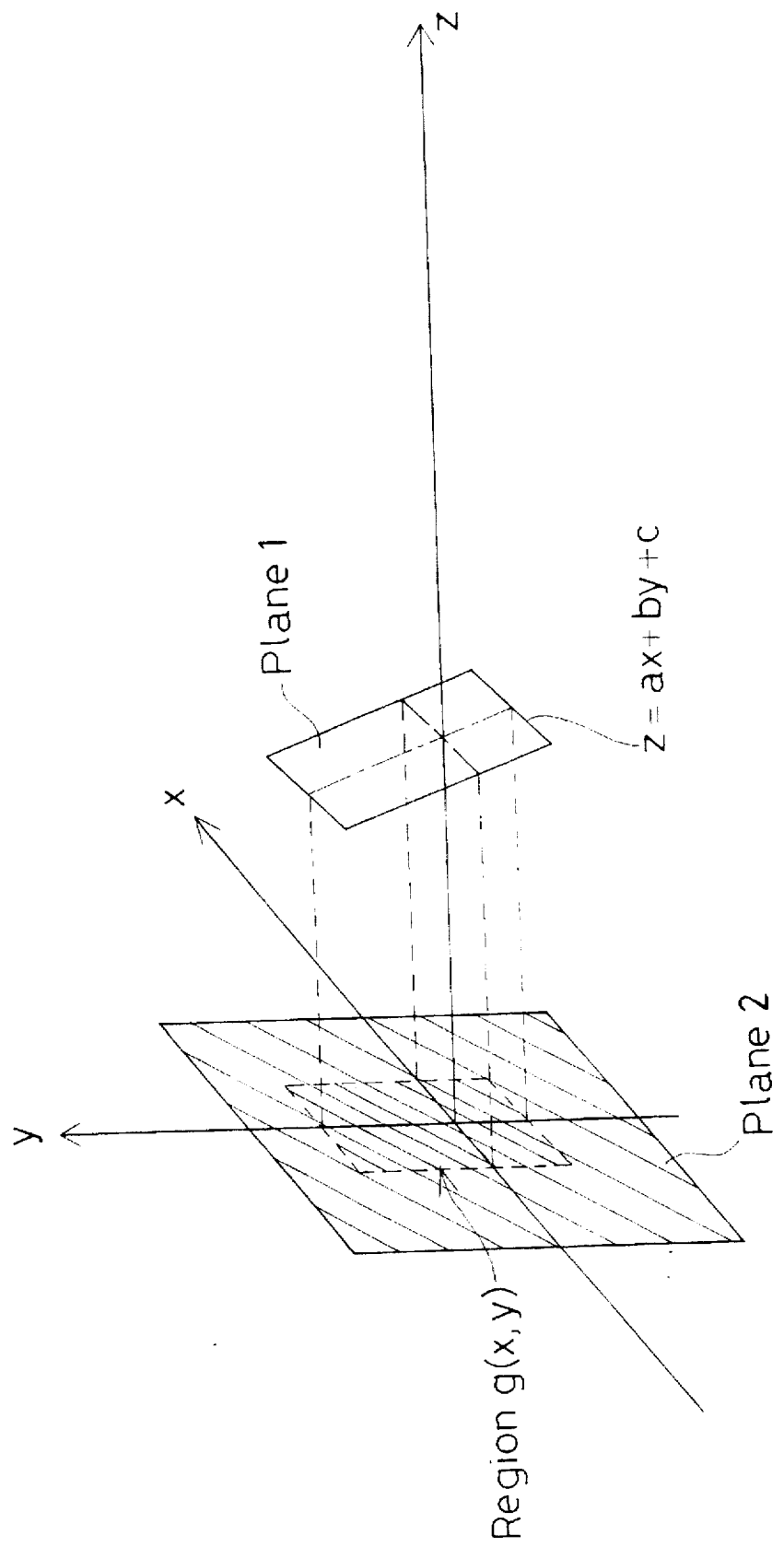
FIG. 2 shows a functional relationship for explaining the image processing method of the present invention.
Figure 3A:
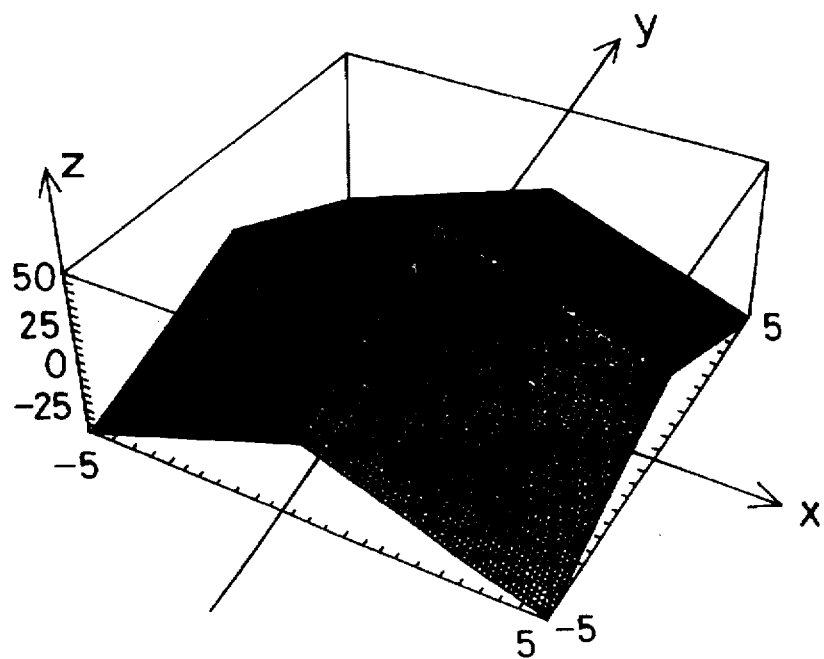
FIGS. 3(a) and 3(b) show one example of transformation performed by the present invention.
Figure 3B:
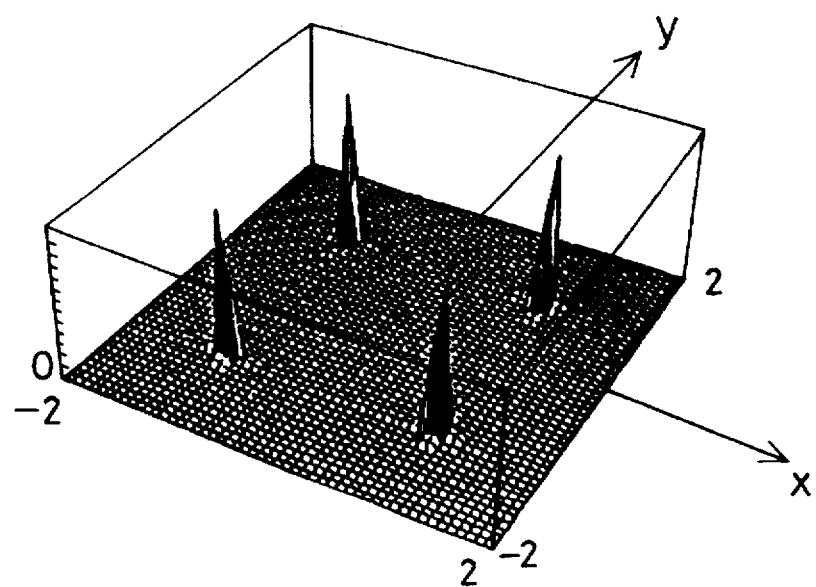
Figure 5:
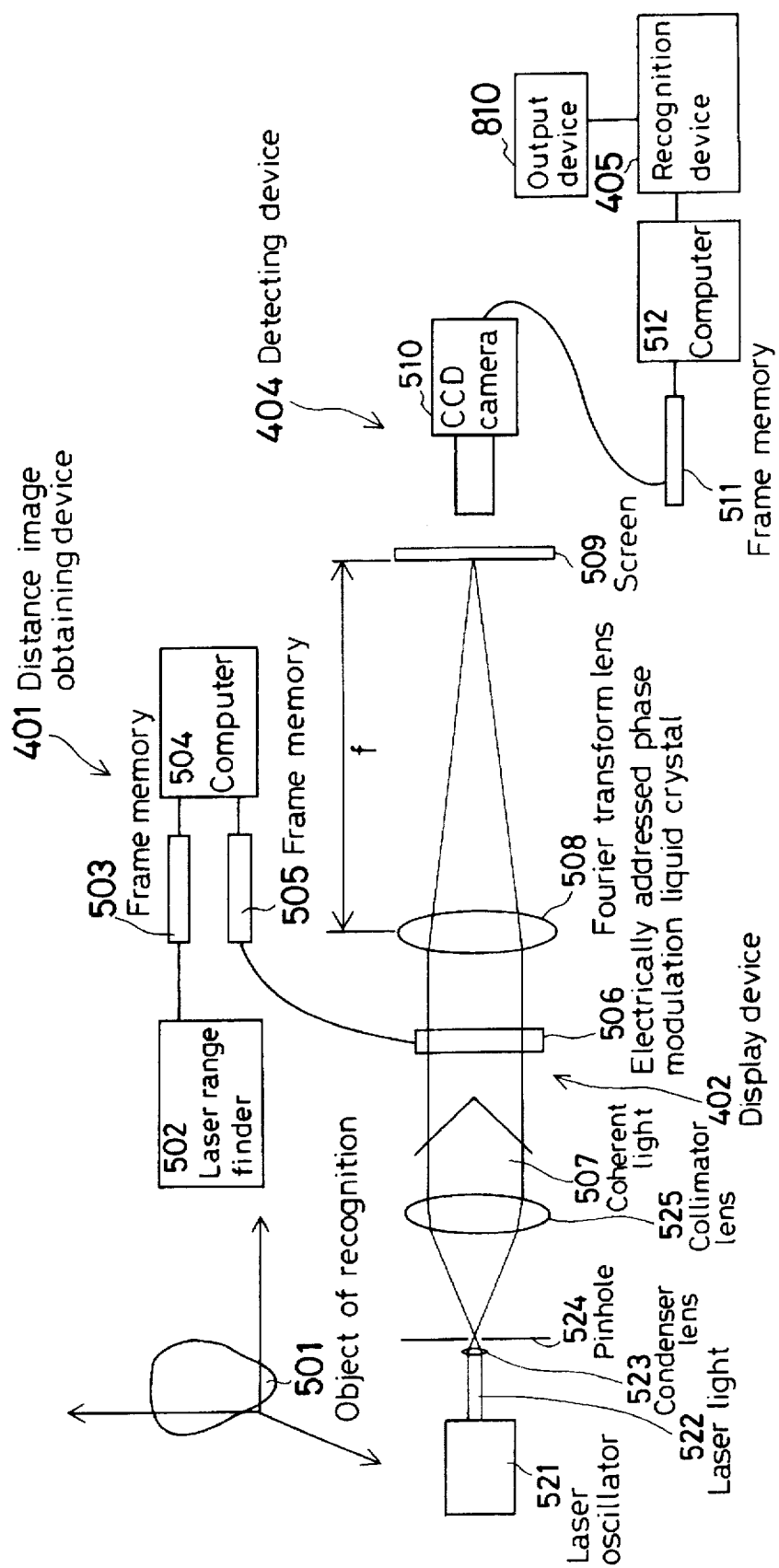
FIG. 5 shows the arrangement of an image processing apparatus according to a first embodiment of the present invention.

A first embodiment of the present invention will be described below with reference to FIG. 5, which shows the arrangement of the first embodiment. In this embodiment, the range image obtaining device 401, which is shown in FIG. 1, comprises a laser range finder 502, a computer 504, and a frame memory 503 which is a memory combined with an A/D converter for taking information obtained by the laser range finder 502 into the computer 504. The image display device 402 comprises a frame memory 505 which is a memory combined with an AD converter for transmitting information from the computer 504, and an electrically addressed phase modulation type liquid crystal 506 as a specific example of an electrically addressed phase modulator, which is used as a display element. The detecting device 404 comprises a screen 509, a CCD camera 510 as a specific example of a two-dimensional imaging device, a frame memory 511, and a computer 512.

First, range information about an object 501 to be recognized is obtained by using the laser range finder 502. Then, the range information obtained is passed through the frame memory 503 and processed in the computer 504 to obtain a range image of the recognition object 501.

Next, the range image obtained is passed through the frame memory 505 and displayed on the electrically addressed phase modulation type liquid crystal 506 in the form of a phase distribution. The electrically addressed phase modulation type liquid crystal 506 is a device which is capable of readily modulating the phase according to an electric signal that is inputted for each pixel of the liquid crystal. That is, range information can be displayed in the form of phase distribution in the range of from $-\pi$ to $+\pi$ simply by inputting the range image signal obtained in the computer 504 to the liquid crystal 506 through the frame memory 505. In this embodiment, $-\pi$ is given to the longest distance point in the image, while $+\pi$ is given to the shortest distance point in the image. In this way, a phase distribution is given. The image that is displayed in the form of phase distribution is read out by approximately parallel coherent light 507. The coherent light 507 is formed by condensing laser light 522 emitted from a laser oscillator 521 through a condenser lens 523, passing the condensed light through a pinhole 524 which is disposed at the back focal point of the condenser lens 523, and passing the light emanating from the pinhole 524 through a collimator lens 525, thereby forming approximately parallel coherent light 507. Light transmitted by the electrically addressed phase modulation type liquid crystal 506 is passed through a Fourier transform lens 508 having a focal length f to form a Fourier transform image at the position of the back focal point of the lens 508. The screen 509 is disposed at the position of the back focal point of the lens 508. Thus, the Fourier spectrum image that is displayed on the electrically addressed phase modulation type liquid crystal 506 is formed on the screen 509, and the image data is taken in by the CCD camera 510.

The data that is obtained by the CCD camera 510 is a Fourier spectrum image which is a square of the Fourier transform of the phase distribution exp(iz(x,y)) displayed on the electrically addressed phase modulation type liquid crystal 506, as has been described above. Accordingly, an intensity peak occurs at a point that indicates the inclination of a plane of z(x,y), corresponding to the area of the plane. Therefore, by detecting the position of the peak and the intensity with the computer 512 through the frame memory 511, it is possible to find the inclination of the equation of a plane in the image being displayed on the electrically addressed phase modulation type liquid crystal 506, together with the peak value. Thus, it is possible to instantaneously detect the inclination of the equation of a plane contained in the range image and an approximate area of the plane.

Then, the detected data, obtained by the detecting device 404, is compared with information concerning a reference object, which has previously been inputted, by a recognition device 405 such as that used in fourth to sixth embodiments (described later), thereby identifying the three-dimensional object which is to be recognized. The result of the recognition is outputted to the outside by an output device 810.

In this embodiment, the output device 810 is an image display screen which is capable of displaying characters, symbols, pictures, etc., e.g., a CRT display, a liquid crystal display device, etc.

The output device 810 may be a sound signal generating device which informs the observer of the result of the recognition by a sound signal, e.g., a sound from a computer, a buzzer, a siren, etc. It is also possible to inform the observer of the recognition result by indicating with a lamp or by flashing of a lamp. The output device 810 may also be a recording device which displays or records the recognition result on a recording medium such as paper or a magnetic disk. In addition to the above-described specific examples thereof, the output device 810 may also be a device which outputs a signal directly to another computer or the like.

[Second Embodiment]

Figure 6:
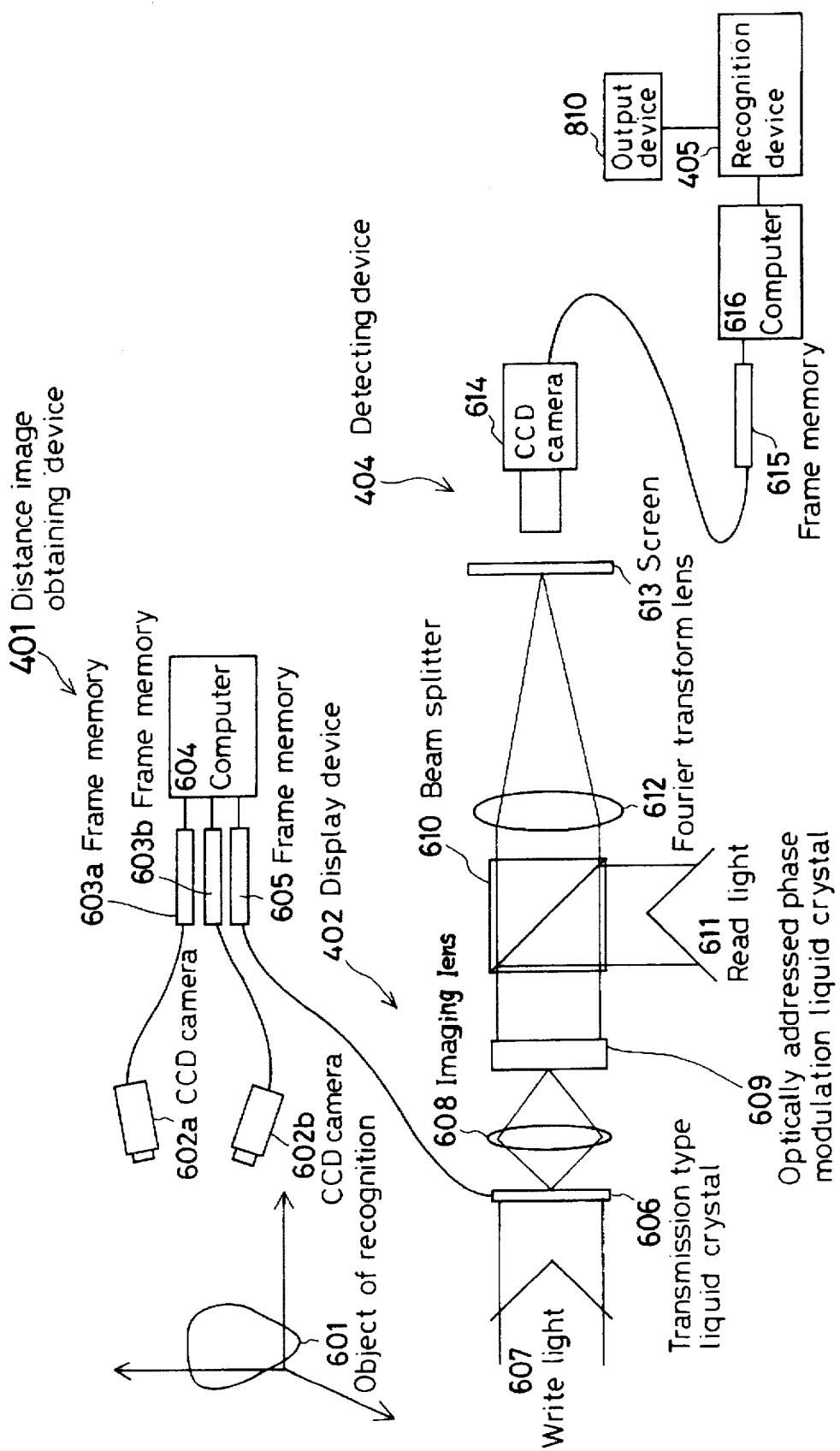
FIG. 6 shows the arrangement of an image processing apparatus according to a second embodiment of the present invention.

Next, a second embodiment of the present invention will be described with reference to FIG. 6.

In the above-described first embodiment, the laser range finder 502, which is a special device for obtaining range information of high accuracy, is used as the range image obtaining device 401. In the second embodiment, however, the range image obtaining device 401 comprises two CCD cameras 602a and 602b as two-dimensional imaging devices, two frame memories 603a and 603b, each having an A/D converter and a memory, and a computer 604, thereby realizing the range image obtaining device 401 using devices which are generally employed. Further, in the first embodiment, a combination of the frame memory 505 and the electrically addressed phase modulation type liquid crystal 506 is used as the image display device 402 so that the arrangement of the apparatus can be simplified. In the second embodiment, however, an optically addressed phase modulator is used as a display device which is capable of modulating the phase according to the intensity of incident light to display an image of higher definition. As a specific example of such a phase modulator, an optically addressed phase modulation type liquid crystal 609 is used in this embodiment. Thus, the image display device 402 comprises a frame memory 605, write light 607, a transmission type liquid crystal display element 606, an imaging lens 608, and the optically addressed phase modulation type liquid crystal 609. The detecting device 404 comprises a screen 613, a CCD camera 614, a frame memory 615, and a computer 616 in the same way as in the first embodiment.

First, an object 601 to be recognized is photographed with two CCD cameras 602a and 602b which are disposed at different positions so that an appropriate disparity is produced between two images photographed by the two CCD cameras 602a and 602b. The two images thus photographed are inputted to the computer 604 through the frame memories 603a and 603b. Since there is a disparity between the two images inputted to the computer 604, the depth of the object 601 is computed by the computer 604 using software on the basis of the disparity between the two images, thereby obtaining range image data concerning the object 601.

The range image data thus obtained is passed through the frame memory 605 and displayed on the transmission type liquid crystal display element 606. The displayed image is read out by write light 607, and passed through the imaging lens 608 to form a range image on the optically addressed phase modulation type liquid crystal 609, thereby writing the range image in the form of light intensity. In the optically addressed phase modulation type liquid crystal 609, phase modulation is carried out so that the phase is $-\pi$ when the light intensity is the strongest, and the phase is $+\pi$ when the light intensity is the weakest. Accordingly, the image that has been written in the form of light intensity to the optically addressed phase modulation type liquid crystal 609 is read out in the form of phase distribution by read light 611 which is applied through a beam splitter 610. The light read out by the read light 611 is passed through a Fourier transform lens 612 to form a Fourier spectrum image of the read image on a screen 613 which is disposed on the back focal plane of the lens 612. Data concerning the Fourier spectrum image is taken in by a CCD camera 614 and detected by a computer 616 through a frame memory 615. The image detected in this way has an intensity peak at a point which indicates the inclination of a plane contained in the image being displayed on the optically addressed phase modulation type liquid crystal 609, and the intensity peak corresponds to the area of the plane, as described above. Therefore, it is possible to instantaneously detect the inclination of the equation of a plane contained in the range image. It should be noted that the apparatus of the second embodiment is provided with a recognition device 405 and an output device 810, which are similar to those in the first embodiment.

Although in the first and second embodiments an electrically addressed phase modulation type liquid crystal and an optically addressed phase modulation type liquid crystal are used as a display element, it should be noted that the present invention is not necessarily limited to these liquid crystals, and that any device capable of modulating the phase may be used, for example, crystal, thermoplastic, semiconductor or other devices.

Regarding the phase modulation range, although in the foregoing embodiments range information is converted into information in the range of from $-\pi$ to $+\pi$ on the basis of the characteristics of presently available phase converters, if the phase converter employed can effect phase conversion in the range of from $n\pi$ to $m\pi$ (m and n: integers), conversion may be effected so that the distance conversion range proportionally corresponds to the phase conversion range of from $n\pi$ to $m\pi$. In this case also, the same effect as that described above can be obtained.

Figure 7A:
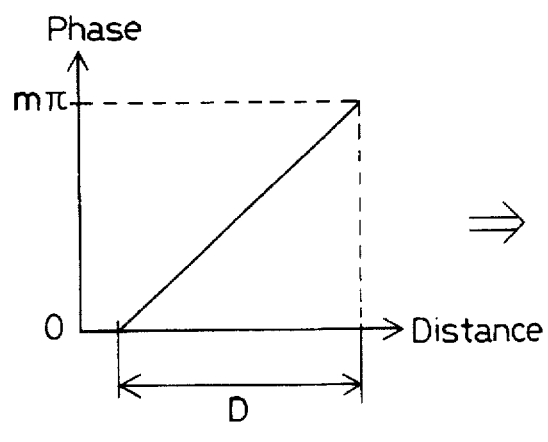
FIGS. 7(a) and 7(b) show that the same effect is obtained in the range of 2π even if the phase conversion range is wider than 2π.
Figure 7B:
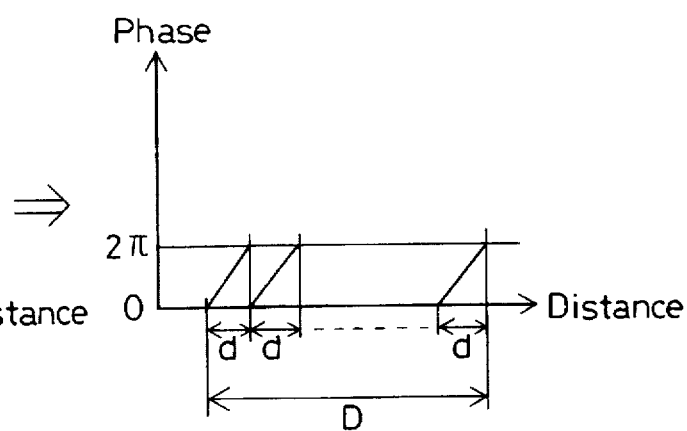

Further, let us assume that, as shown for example in FIG. 7(a), the distance conversion range is D, and it corresponds to the phase conversion range of from 0 to $m\pi$. If the distance D is divided into certain small distances d, as shown in FIG. 7(b), and each distance d is made to correspond to the range of from 0 to $2\pi$, then it is obvious that the same effect as that in the case of FIG. 7(a) is obtained in the phase conversion range of from 0 to $2\pi$.

[Third Embodiment]

Figure 8:
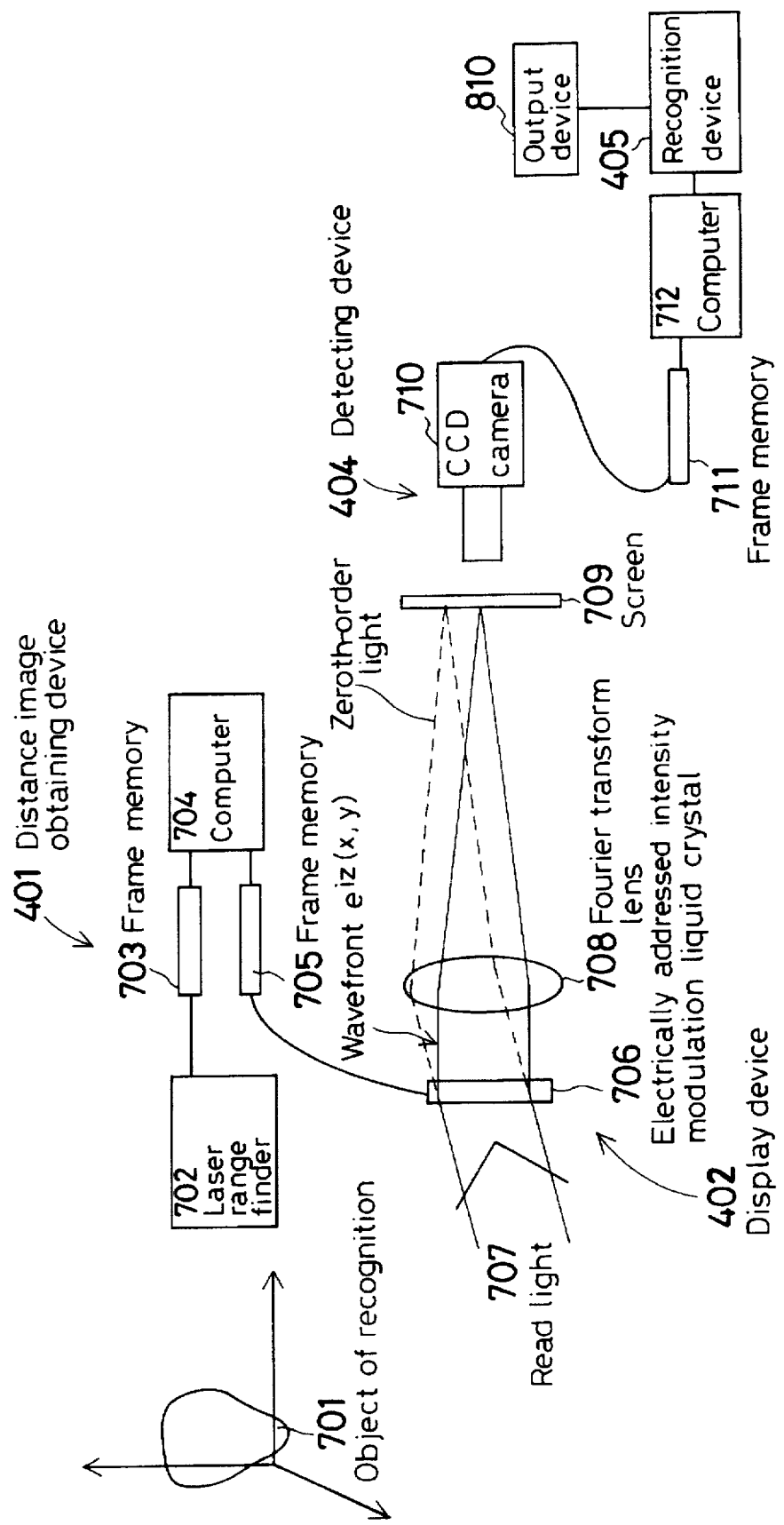
FIG. 8 shows the arrangement of an image processing apparatus according to a third embodiment of the present invention.

Next, a third embodiment of the present invention will be described with reference to FIG. 8.

In the above-described first and second embodiments, a phase modulation type liquid crystal is used as a display element in the image display device 402 to display a phase distribution. However, the phase modulation type liquid crystal is a special device in the present state of art. In the third embodiment, therefore, an intensity modulation type spatial light modulator, which is used even more generally, is employed as a display element, and as a specific example of such a spatial light modulator, an intensity modulation type liquid crystal is used in this embodiment.

Figure 9:
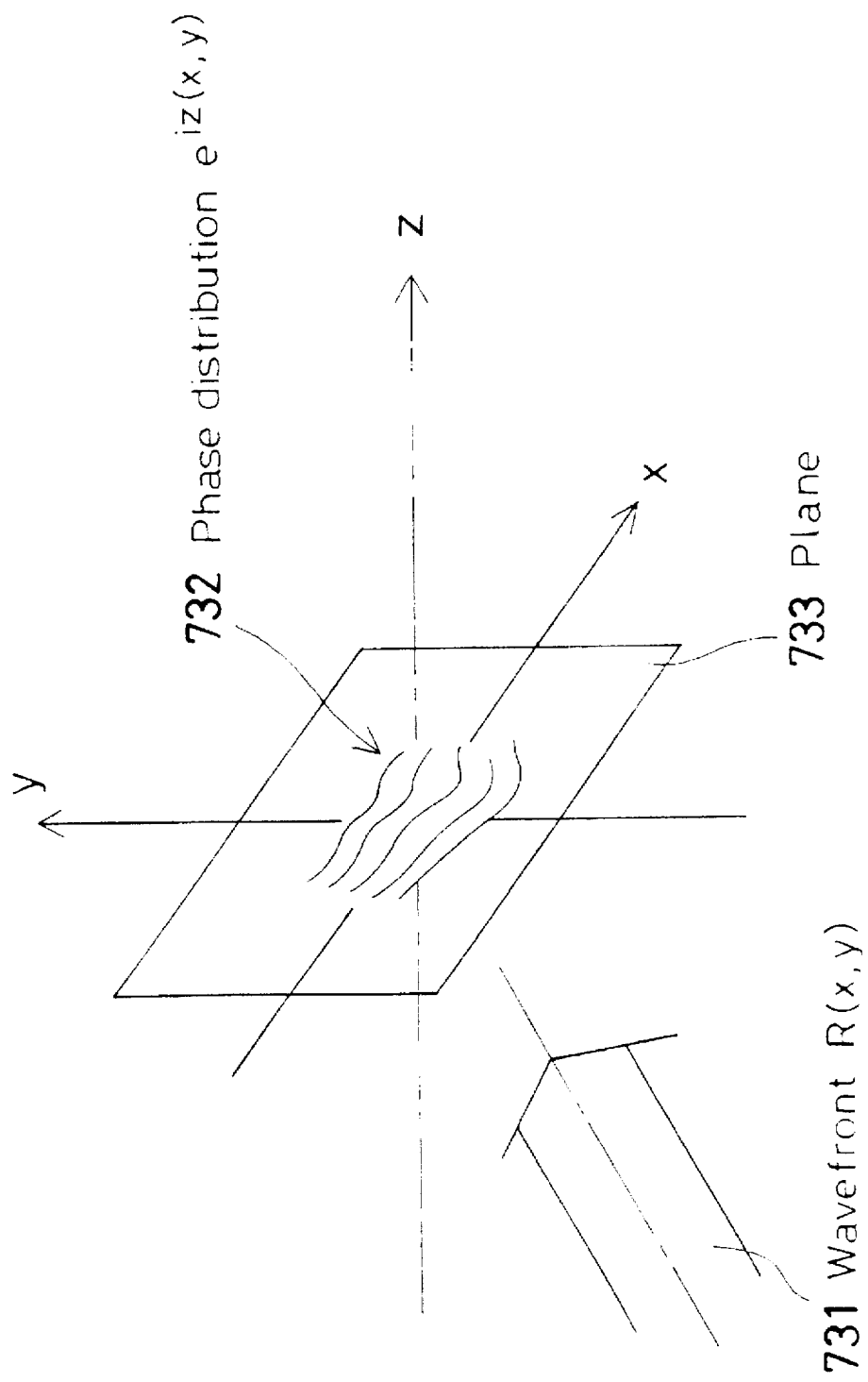
FIG. 9 is a view for explaining a method of producing a computer generated hologram used in the third embodiment.

The basic arrangement of the third embodiment is the same as that of the first embodiment. In this embodiment, however, an electrically addressed intensity modulation type liquid crystal 706 is used in place of the electrically addressed phase modulation type liquid crystal 506. First, range information about an object 701 to be recognized is obtained by using a laser range finder 702 in the same way as in the first embodiment. Next, the range information is passed through a frame memory 703, and a range image of the object 701 is obtained by a computer 704. In the computer 704, further, a computer generated hologram is produced on the basis of the range image $z(x,y)$ so that one of light rays read out by read light 707 has a wavefront of $\exp(iz(x,y))$. For example, as shown in FIG. 9, a wavefront $R(x,y)$ 731 is assumed with respect to a plane 733 of $z=0$ in a coordinate system $(x,y,z)$, and interference fringes between the wavefront 731 and the phase distribution $\exp(iz(x,y))$ 732, i.e., $$L(x,y)=|e^{iz(x,y)}+R(x,y)|^2$$

are computed on the plane 733, thereby obtaining a computer generated hologram $L(x,y)$. The computer generated hologram thus obtained is passed through a frame memory 705 and displayed on the electrically addressed intensity modulation type liquid crystal 706. The displayed hologram is read by using the wavefront $R(x,y)$, which has been assumed above, as read light 707. By doing so, light rays read out from the computer generated hologram include one which has a wavefront of $\exp(iz(x,y))$. The wavefront of $\exp(iz(x,y))$ is Fourier-transformed by using a Fourier transform lens 708, and a Fourier spectrum image that is formed on a screen 709 is taken in by a CCD camera 710, and detected by a computer 712 through a frame memory 711. The Fourier spectrum image shows the inclination of a plane constituting the object 701 to be recognized and an approximate area of the plane in the same way as those described above. Thus, the same effects as those in the first and second embodiments are obtained. It should be noted that this embodiment is provided with a recognition device 405 and an output device 810, which are similar to those in the first embodiment.

In the foregoing embodiments a pair of CCD cameras or a laser range finder is employed as the range image obtaining device 401. However, it is also possible to adopt a method in which the object to be recognized is photographed from two different positions by using a single CCD camera, and a range image is obtained from two images which are obtained by the CCD camera, although the processing speed becomes slower than in the case of the above-described method. In a case where the object to be recognized moves with time, if the object is photographed twice at a certain sampling time with one fixed CCD camera, a range image can be obtained from two images thus obtained.

Although in the third embodiment an electrically addressed intensity modulation type liquid crystal is used as an example of the display element, it is also possible to realize the same arrangement as the above by using an optically addressed intensity modulation type liquid crystal, crystal, thermoplastic, semiconductor or other similar device.

Further, although in the foregoing embodiments a CCD camera is used as an example of a two-dimensional imaging device, it is also possible to use an image pickup tube or other solid-state image sensing device.

[Fourth Embodiment]

Next, an embodiment concerning a recognition apparatus that uses an image obtained as described above will be shown.

Since image information obtained by using the above-described technique can be used as data similar to an image which is formed by projecting the aforementioned extended Gaussian sphere onto a plane of $Z=-1$, a method which is similar to the foregoing collating method can be realized on a computer by using software.

Figure 10:
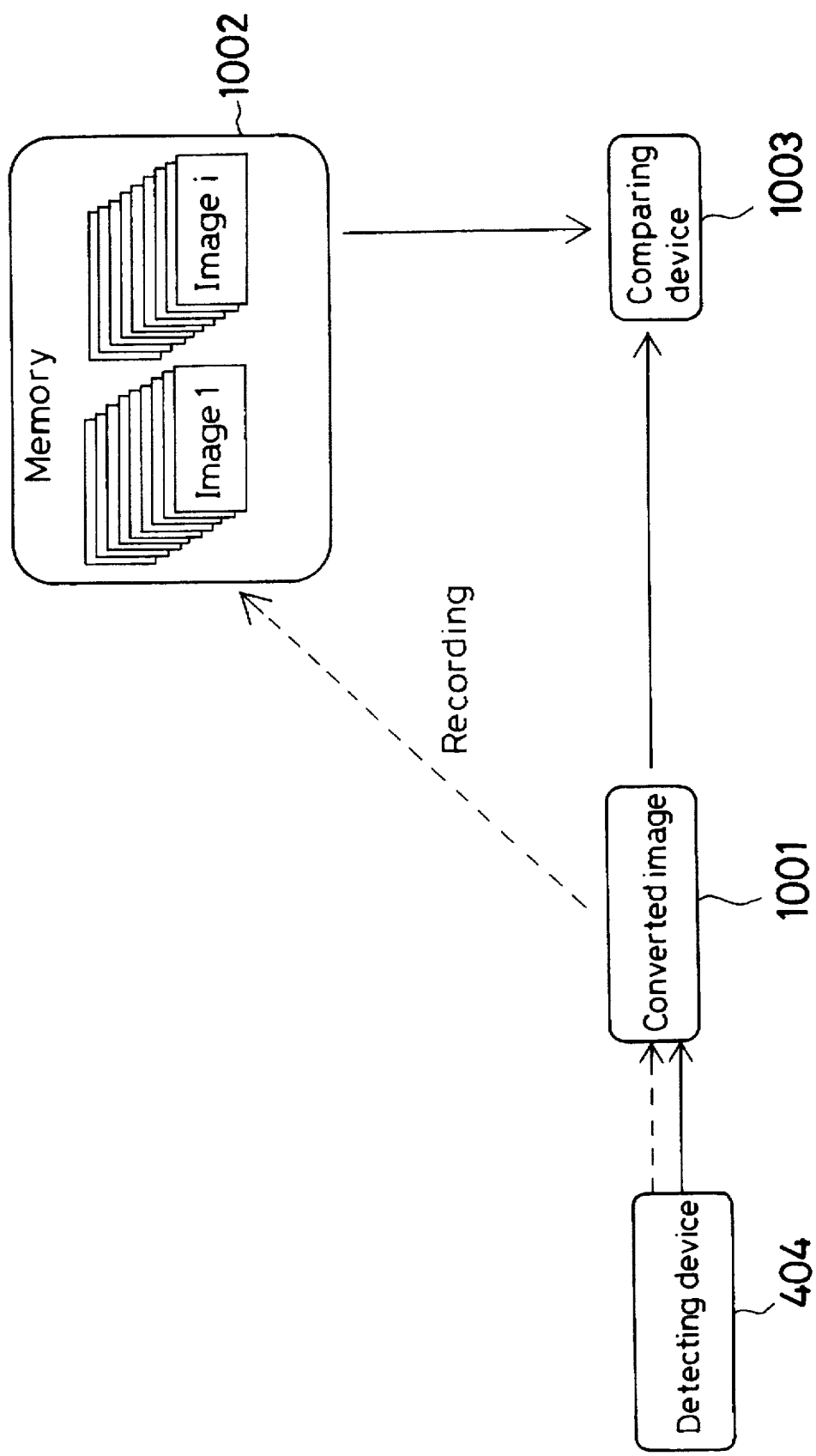
FIG. 10 is a block diagram of a recognition apparatus according to a fourth embodiment of the present invention.

A specific example of the above method will be shown below by using the block diagram of FIG. 10. Basically, the collating method comprises two steps: a step of recording information concerning an object which is to be referred, and a step of making comparison between information concerning an object to be recognized and the reference object information. The flow of information in the step of recording the reference object information is shown by the broken lines in FIG. 10, and the flow of information in the step of comparing the two pieces of information is shown by the solid lines in the figure. First, as the recording step, converted images 1001, which are obtained by the above-described technique, are prepared in advance for various circumstances in which a variety of reference objects are seen in various postures and at various angles. The images 1001 are stored in a memory 1002 of a computer. Next, as the comparing step, a range image of the object to be recognized is obtained by the same conversion technique using the same apparatus. The converted image 1001 of the object to be recognized is compared with each of the images stored in the memory 1002 by a comparing device 1003. More specifically, a difference between the two images is squared for each pixel, and a sum total of squared differences is figured out, thereby obtaining the difference between the two images. If the two images are equal or similar to each other, the sum total is equal or close to zero, and the two images are found to be equal to each other. Thus, the object to be recognized is identified as the relevant reference object. Further, the image of the object to be recognized is compared with each of the images of the relevant reference object as seen from various directions to find a match between two images, thereby deciding a direction in which the object to be recognized faces. Then, the result of the decision is outputted.

In this embodiment, when a comparison is made with information concerning a plurality of reference objects, the system may be arranged such that a three-dimensional object similar to the object to be recognized is simply determined from among the plurality of reference objects. Further, each reference object may be rotated when the three-dimensional object to be recognized is compared with the direction of the reference object for viewing to determine which direction the object to be recognized is being viewed from in space. It is also possible to carry out comparison by rotating a reference object after it has been determined.

In a case where there is only one reference object, or a reference object has already been determined, a comparison is carried out to decide only a direction from which the object image is being viewed.

Figure 11:
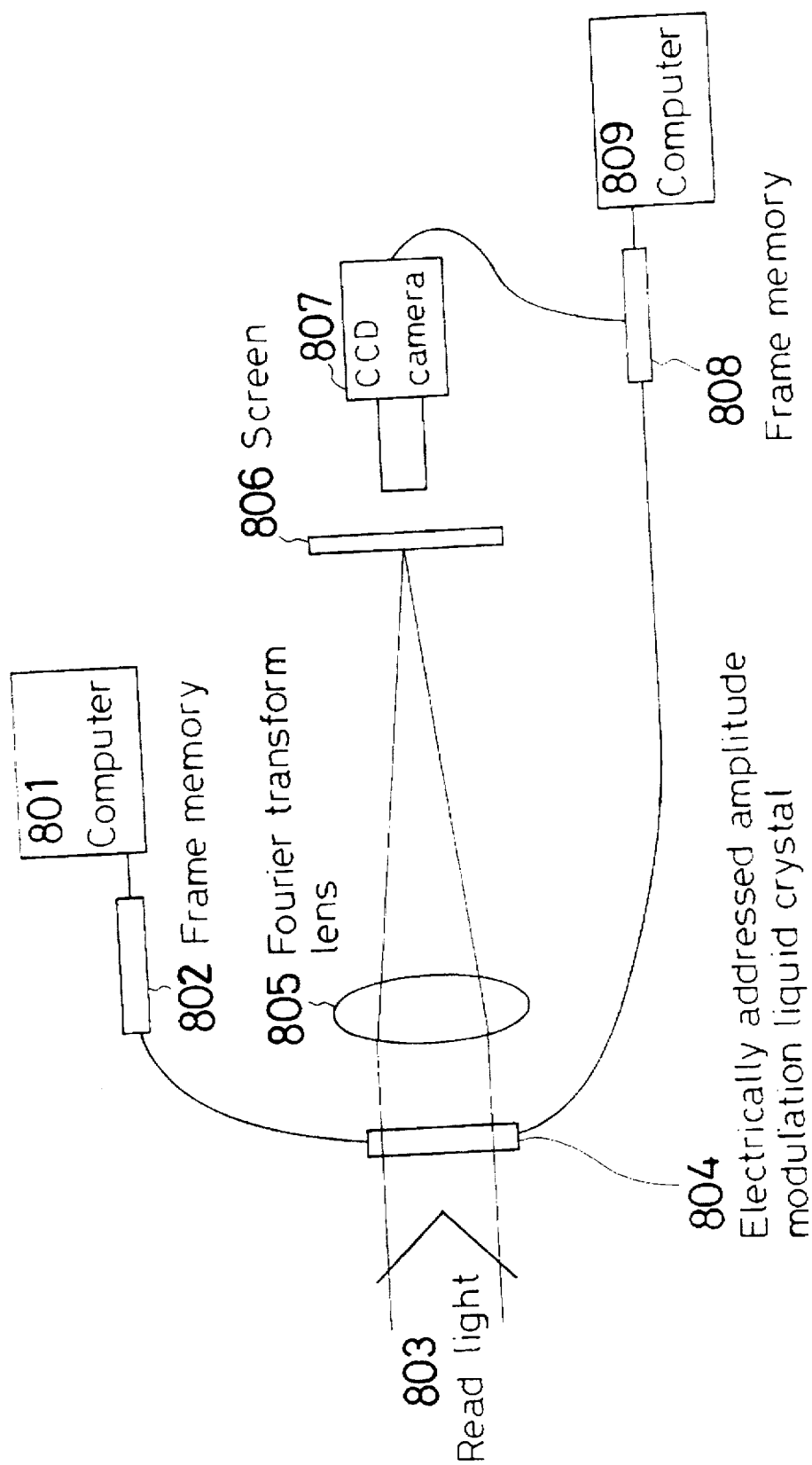
FIG. 11 shows the arrangement of an optical joint transform correlation device as an example of a comparison device used in the fourth embodiment.

The comparing device 1003 may carry out a comparison by using a value of correlation between two images instead of the sum of least squares. If the two images are equal to each other, the correlation value is larger than the value of correlation between the recognition object image and another image. Thus, it is possible to know which image is equal to the image of the object to be recognized. Calculation of the correlation between two images may be optically realized, for example, by a technique known as joint transform correlation, in which correlation calculation is realized by carrying out Fourier transformation twice. More specifically, a Fourier transform optical system such as that shown in FIG. 11 is employed.

The system is arranged such that the image 1001, which is obtained by the above-described technique, and a reference image, which has previously been stored in the memory 1002, can be simultaneously displayed on an electrically addressed amplitude modulation type liquid crystal 804 by a computer 801 so that the origins of the two images lie on (x1,y1) and (x2,y2), respectively, (where $x1 \neq x2$, or $y1 \neq y2$). The two images are displayed on the electrically addressed amplitude modulation type liquid crystal 804 through a frame memory 802. The displayed image, in which the image of the recognition object and the reference image are simultaneously displayed, is read by read light 803, and passed through a Fourier transform lens 805, thereby obtaining a Fourier spectrum image on a screen 806 which is disposed at the back focal point of the Fourier transform lens 805. Next, the Fourier spectrum image is photographed by a CCD camera 807, and passed through a frame memory 808, thereby displaying the Fourier spectrum image on the electrically addressed amplitude modulation type liquid crystal 80. In the figure, reference numeral 809 denotes a computer for driving the frame memory 808. The Fourier spectrum image is further subjected to Fourier transformation by the same technique as the above. Thus, it is possible to obtain images showing the correlation between the two images, which are centered at (x1−x2,y1−y2) and (−x1+x2, −y1+y2) on the screen 806. It should be noted that, by displaying not one but a plurality of reference images on the electrically addressed amplitude modulation type liquid crystal 804, a correlation operation with respect to a plurality of reference images can be instantaneously performed, and it becomes possible to recognize the object under observation at higher speed.

[Fifth Embodiment]

Figure 12:
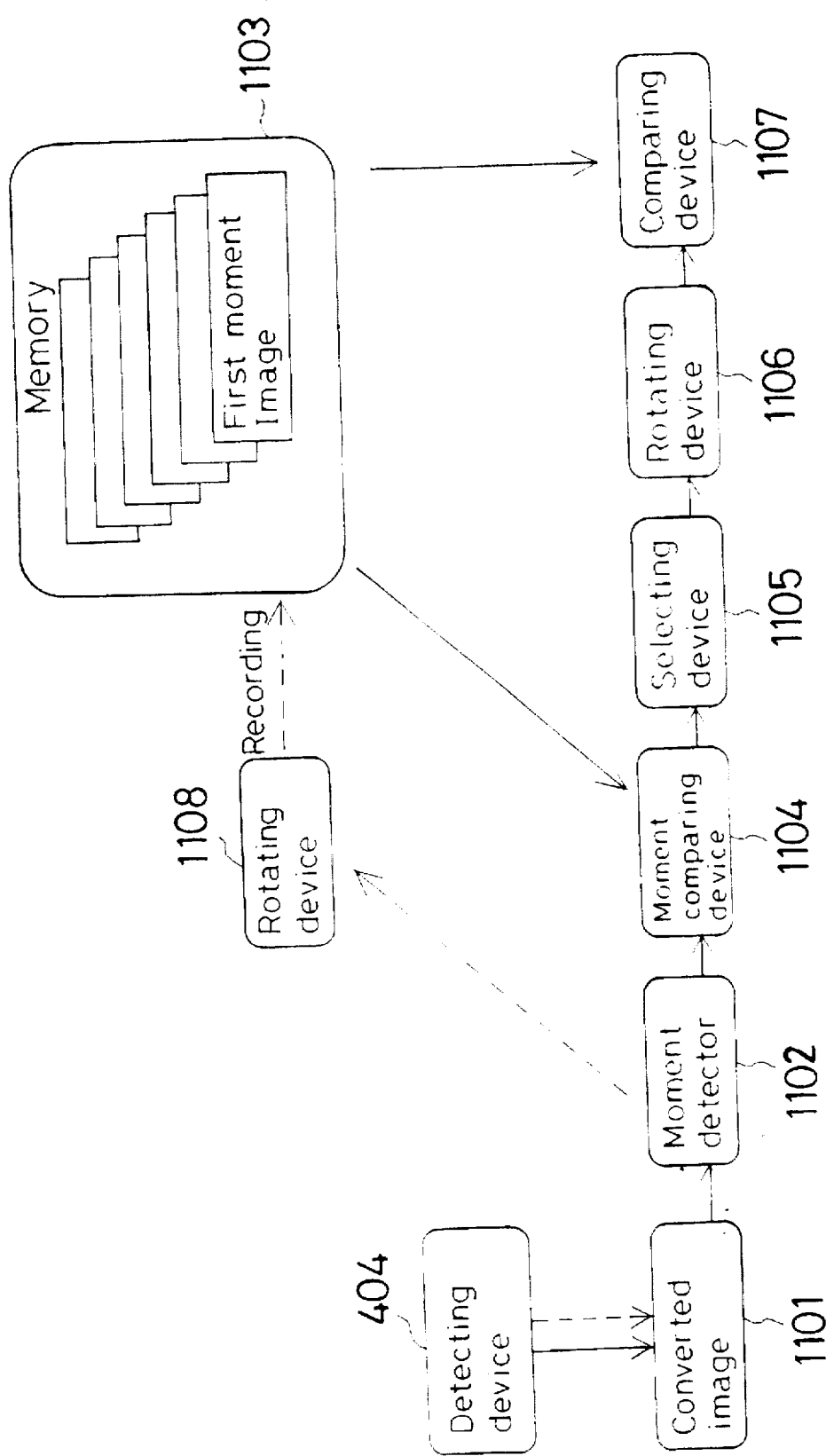
FIG. 12 is a block diagram of a recognition apparatus according to a fifth embodiment of the present invention.

Next, a method in which the characteristics of the extended Gaussian sphere are used in order to reduce the number of reference images to a considerable extent will be described with reference to the block diagram of FIG. 12. This method also comprises two steps: a step of recording information concerning a reference object, and a step of making a comparison between information concerning an object to be recognized and the reference object information. The flow of information in the step of recording the reference object information is shown by the broken lines in FIG. 12, and the flow of information in the step of comparing the two pieces of information is shown by the solid lines in the figure. First, as the recording step, a multiplicity of reference images and first moments related to the images are previously recorded in a memory 1103. More specifically, a range image of each reference object is subjected to the above-described conversion to obtain a converted image 1101, as described above. Then, first and second moments are obtained from the converted image 1101 by a moment detector 1102, as described in connection with the related art. The image 1101 is rotated by a rotating device 1108 so that the axis on which the second moment is the least coincides with a specified axis L. Then, the rotated image and the first moment related to the image are recorded in the memory 1103.

Next, as the comparing step, a converted image 1101 of an object to be recognized is obtained by the above-described technique. Then, first and second moments are obtained from the converted image 1101 by the moment detector 1102. Then, the first moment obtained is compared with the first moment of each reference image, which has been prepared in the memory 1103, by a moment comparing device 1104, and an image for comparison of a reference object for which the first moment difference exceeds a certain threshold value is selected by a selecting device 1105. Further, the image 1101 is rotated by a rotating device 1106 so that the axis on which the second moment is the least, which has been obtained by the moment detector 1102, is coincident with the specified axis L. Then, the rotated image is compared with the image selected for comparison. The comparison is executed in a comparing device 1107 by performing computation for the sum of least squares and correlation, as described in the fourth embodiment.

[Sixth Embodiment]

Figure 13:
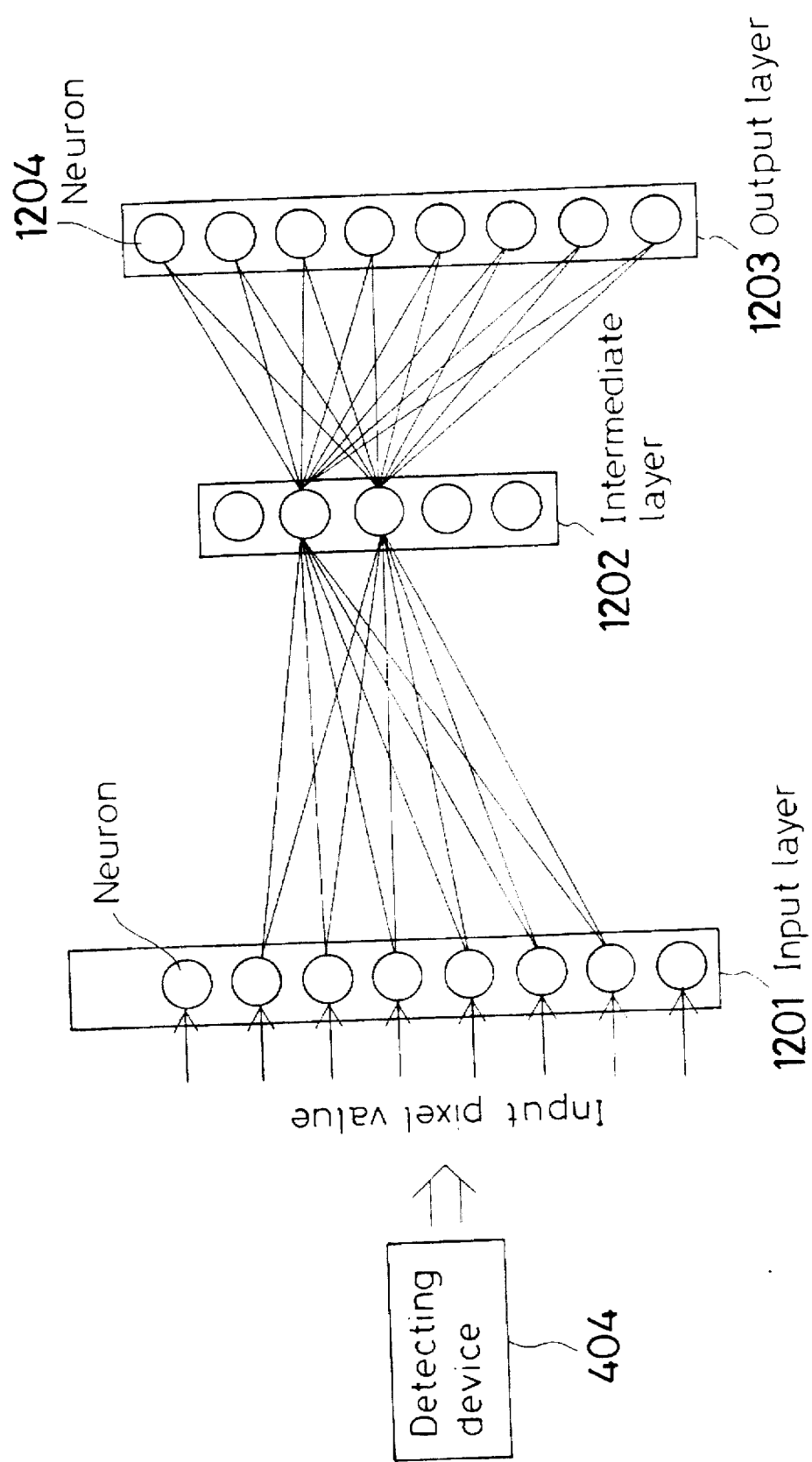
FIG. 13 shows the arrangement of a recognition apparatus according to a sixth embodiment of the present invention.

Next, an example of a recognition apparatus that employs a back propagation type neural net having a three-layer structure will be shown. As shown in FIG. 13, an image is obtained by the detecting device 404 according to the above-described technique, for example, and the value of each pixel of the image is inputted to an input layer 1201 of the neural net. In this back propagation model, it is first necessary to determine a synapse weight between an input layer 1201 and an intermediate layer 1202 and between the intermediate layer 12020 and an input layer 1203 of the neural net. For this purpose, a synapse weight between each pair of adjacent layers should be fixed by using back propagation learning rules so that, when the pixel values of an image of a reference object, which is obtained by the detecting device 404 using the above-described technique, are sequentially inputted to the neurons in the input layer 1201 of the neural net, neurons in the output layer 1203 of the neural net selectively fire with respect to the object to be recognized. More specifically, learning is carried out with respect to various objects by using back propagation learning rules so that, when a range image of a specific object A as observed from a certain direction in a certain posture is inputted to the input layer 1201, specific neurons 1204 in the output layer 1203 fire. In recognition, an image which shows the inclination of an object to be recognized and the area thereof is obtained by the above-described technique, and inputted to the input layer 1201 of the back propagation model. At this time, a neuron which is firing the most of the neurons firing in the output layer 1203 of the neural net is detected. By doing so, the object can be recognized as one which corresponds to the neuron. Although the principle of the recognition apparatus in a case where back propagation is employed as a neural net has been described above, it will be obvious that the recognition apparatus can also be realized by employing a Hopfield type neural net.

[Seventh Embodiment]

Figure 4:
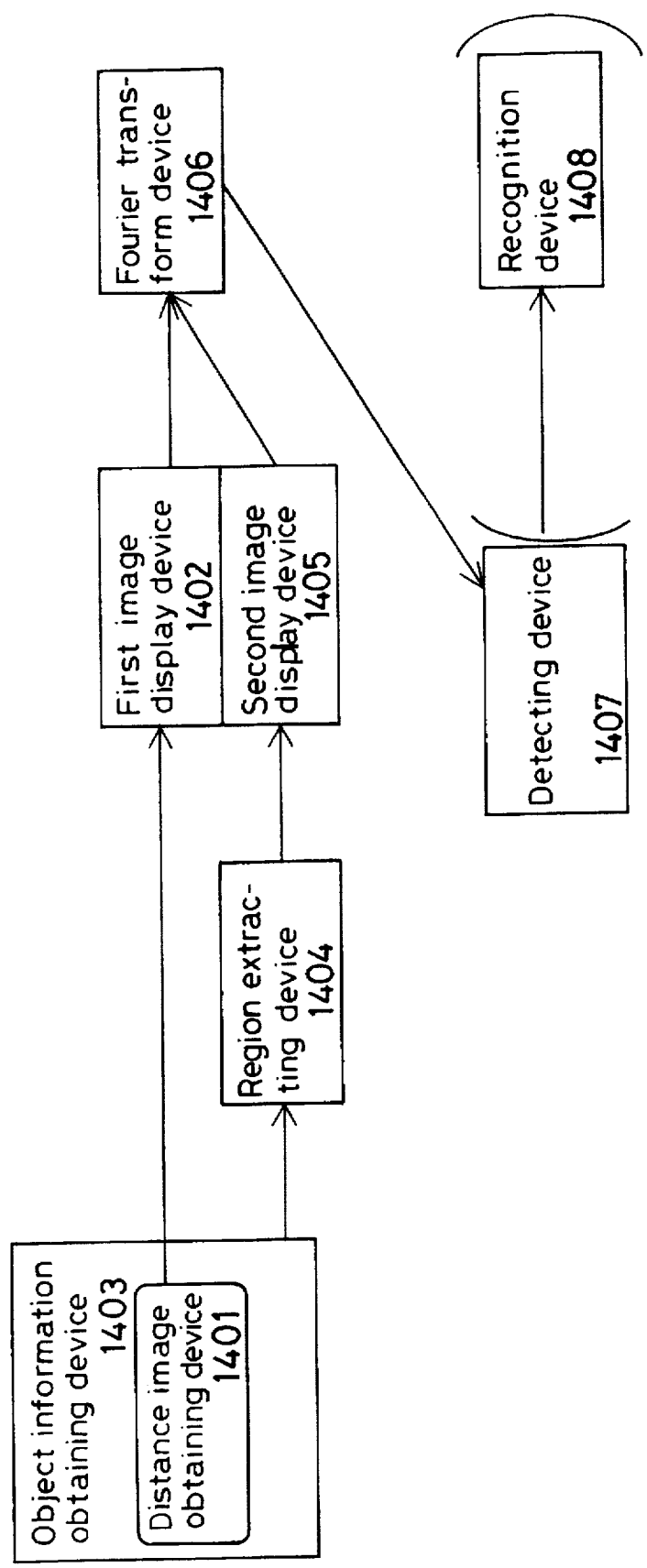
FIG. 4 is a block diagram showing the arrangement of another image processing apparatus according to the present invention.
Figure 14:
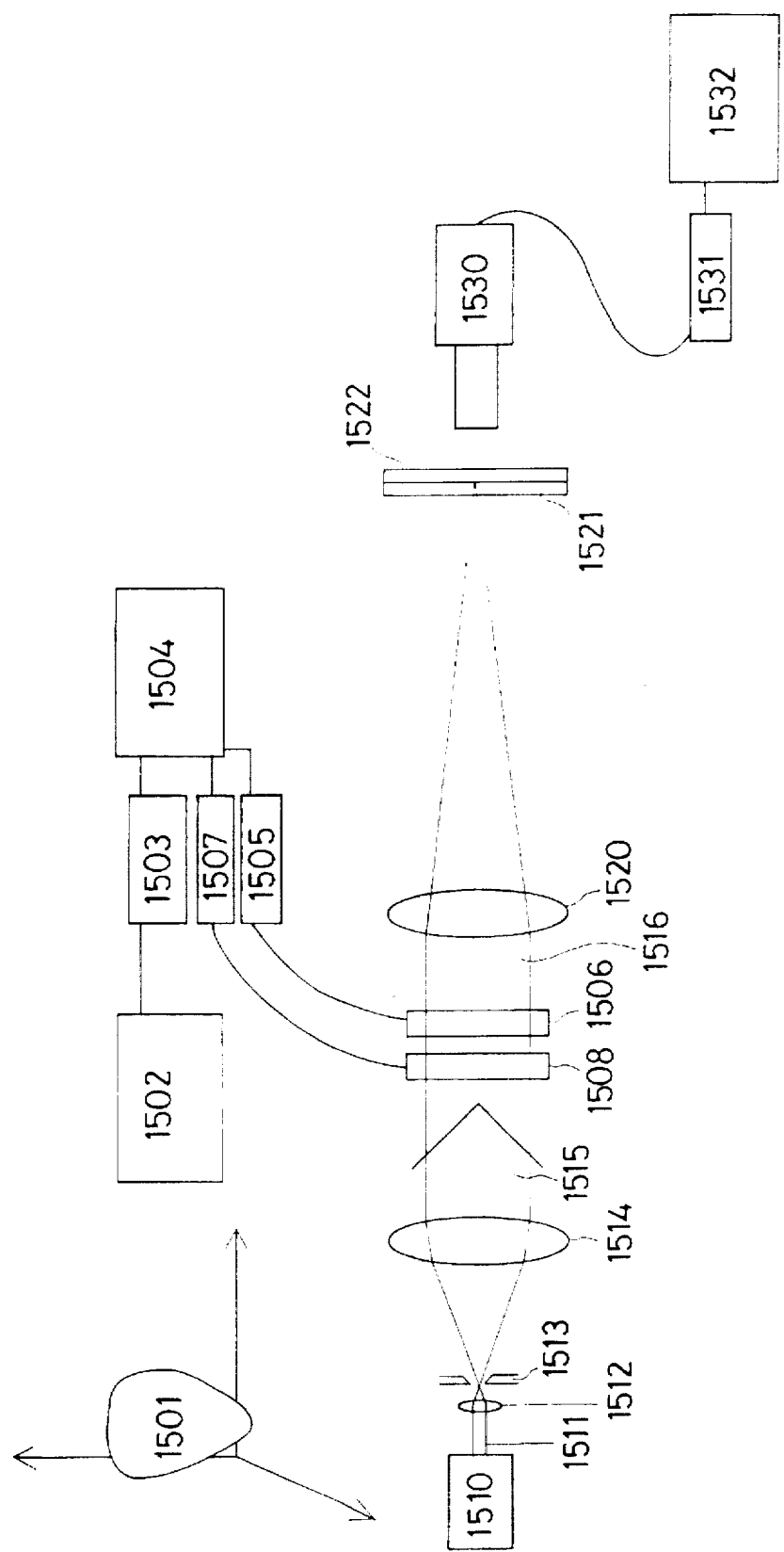
FIG. 14 shows the arrangement of an image processing apparatus according to a seventh embodiment of the present invention.

Next, a seventh embodiment of the present invention, which is an embodiment according to another aspect of the present invention, will be described with reference to FIG. 14. In this embodiment, the object information obtaining device 1403, which is shown in FIG. 4, comprises only the range image obtaining device 1401. In this embodiment, the object information obtaining device 1403 comprises a laser range finder 1502, a computer 1504, and a frame memory 1503 which is a memory combined with an A/D converter to take information obtained by the laser range finder 1502 into the computer 1504. The first image display device 1402 comprises a frame memory 1505 which is a memory combined with an A/D converter to transmit information from the computer 1504, and a phase modulation type electrically addressed spatial light modulator (hereinafter referred to as "SLM") 1506 as a display element. In this embodiment, the SLM 1506 is a liquid crystal SLM. The region extracting device 1404 is realized by using software on the computer 1504. The second image display device 1405 comprises a frame memory 1507 which is a memory combined with an A/D converter to transmit information from the computer 1504, and an intensity modulation type electrically addressed SLM 1508 as a display element. In this embodiment, the SLM 1508 is a liquid crystal SLM. The detecting device 1407 comprises a filter 1521, a screen 1522, a two-dimensional imaging device 1530, and a frame memory 1531. In this embodiment, a CCD camera is used as a specific example of the two-dimensional imaging device 1530.

First, range information about an object 1501 to be recognized is obtained by using the laser range finder 1502. The range information is passed through the frame memory 1503, and processed in the computer 1504, thereby obtaining a range image of the object 1501 to be recognized.

Next, the range image thus obtained is passed through the frame memory 1505, and displayed as a phase distribution on the SLM 1506. Since the SLM 1506 is an electrically addressed liquid crystal phase modulator, it can modulate the phase in accordance with an electric signal inputted for each pixel of the liquid crystal. Thus, the SLM 1506 is capable of readily modulating the phase. In other words, range information can be displayed in the form of phase in the range of from $-\pi$ to $+\pi$ simply by inputting a range image signal obtained in the computer 1504 to the liquid crystal through the frame memory 1505. In this embodiment, $-\pi$ is given to the longest distance in the image, and $+\pi$ to the shortest distance in the image. In this way, a phase distribution is displayed.

Next, region division is executed in the computer 1504 using the range image obtained by the laser range finder 1502 as three-dimensional information.

In this embodiment, spatial filtering is carried out by using a weight table and a product-sum operation to obtain an edge of the image, thereby effecting region division. The weight table in this embodiment is a matrix of 3×3. In filtering, computation is performed for each pixel as follows:

$$Q(x,y) = (1/n) \sum_{i=-1}^{1} \sum_{j=-1}^{1} P(x+i, y+j) W(i,j)$$

n: constant where W(i,j) is a component of the weight table, and P(x,y) is an image to be subjected to filtering.

In this embodiment, a Laplacian table as shown in FIG. 15(a) is employed as a weight table for filtering. Laplacian is an operator to obtain the second differential of an image. Accordingly, the Laplacian table is used to obtain a boundary between regions in the range image at which the density value, which is the "jump edge", sudenly changes. The region boundary is a boundary between the object to be recognized and the background. Therefore, the region that is surrounded by the edge may be said to be a region in which the object to be recognized is present. In a case where one region cannot be determined by edge information obtained by the Laplacian operator, a computation called "Sobel's operator", which is shown in FIG. 15(b), is carried out over the whole image, thereby detecting a boundary whose gradient changes discontinuously. According to Sobel's operator, as shown in the figure, two weight tables are effected to obtain absolute values, respectively, and these absolute values are added together. Boundaries obtained by using Laplacian are joined by using a boundary obtained by the Sobel's operator, thereby effecting region division, and further enabling a specific region to be determined in the divided regions. Then, the specific region is extracted.

A pattern in which an opening is defined by the extracted region is prepared by the computer 1504, and displayed on the electrically addressed intensity modulation and transmission type SLM 1508 through the frame memory 1507, thereby allowing light to pass through the opening of the extracted region, while preventing almost all light from passing through the other region.

The patterns which are displayed on the SLMs 1508 and 1506 are read out by approximately parallel coherent light 1515 which is formed as follows: Although various coherent light sources may be employed, a helium-neon laser light source 1510 is used in this embodiment. Laser light 1511 emitted from the helium-neon laser light source 1510 is condensed by a lens 1512, and passed through a pinhole 1513 which is disposed at the back focal point of the condenser lens 1512. Light passing through the pinhole 1513 is passed through a collimator lens 1514 to form approximately parallel coherent light 1515.

First, light that is incident on the SLM 1508 reads the pattern having an opening defined by the object to be recognized, which is displayed on the SLM 1508. Thus, only light that passes through the region in which the recognition object is present is incident on the subsequent SLM 1506. The incident light, which has read the region of the recognition object, reads out only a region in which the recognition object is present in the image expressing the range image as a phase distribution, which is displayed on the SLM 1506. The light 1516 that has read out these two images then passes through a Fourier transform lens 1520 having a focal length f and further through a filter 1521 and forms a Fourier transform image on a screen 1522 which is disposed at the back focal point of the lens 1520. The image that is formed on the screen 1522 is photographed by a CCD camera 1530, and taken in by a computer 1532 through a frame memory 1531.

Data that is obtained by the CCD camera 1530 is a Fourier spectrum image which is the square of Fourier transform of the phase distribution exp(iz(x,y)) displayed on the SLM 1506 within the opening region that is displayed by the SLM 1508. Therefore, a peak occurs at a point which indicates the inclination of a plane constituting the recognition object displayed on the SLM 1508, and the peak corresponds to the area of the plane. Accordingly, by detecting the position and intensity of the peak with the computer 1532 through the frame memory 1531, it is possible to instantaneously detect the inclination of the equation of each plane constituting the recognition object and an approximate area of the plane.

The filter 1521 is produced by writing a pattern on a film so that the transmission changes at $\{(2\pi x/f\lambda)^2 + (2\pi y/f\lambda)^2 + 1\}^{1/2}$ with respect to the position (x,y), as described above. By disposing the filter 1521, filtering can be effected so that the apparent area of a plane as observed corresponds to the actual area. Thus, the light intensity is allowed to correspond to the actual area without the need of making correction for each data actually obtained.

[Eighth Embodiment]

Figure 16:
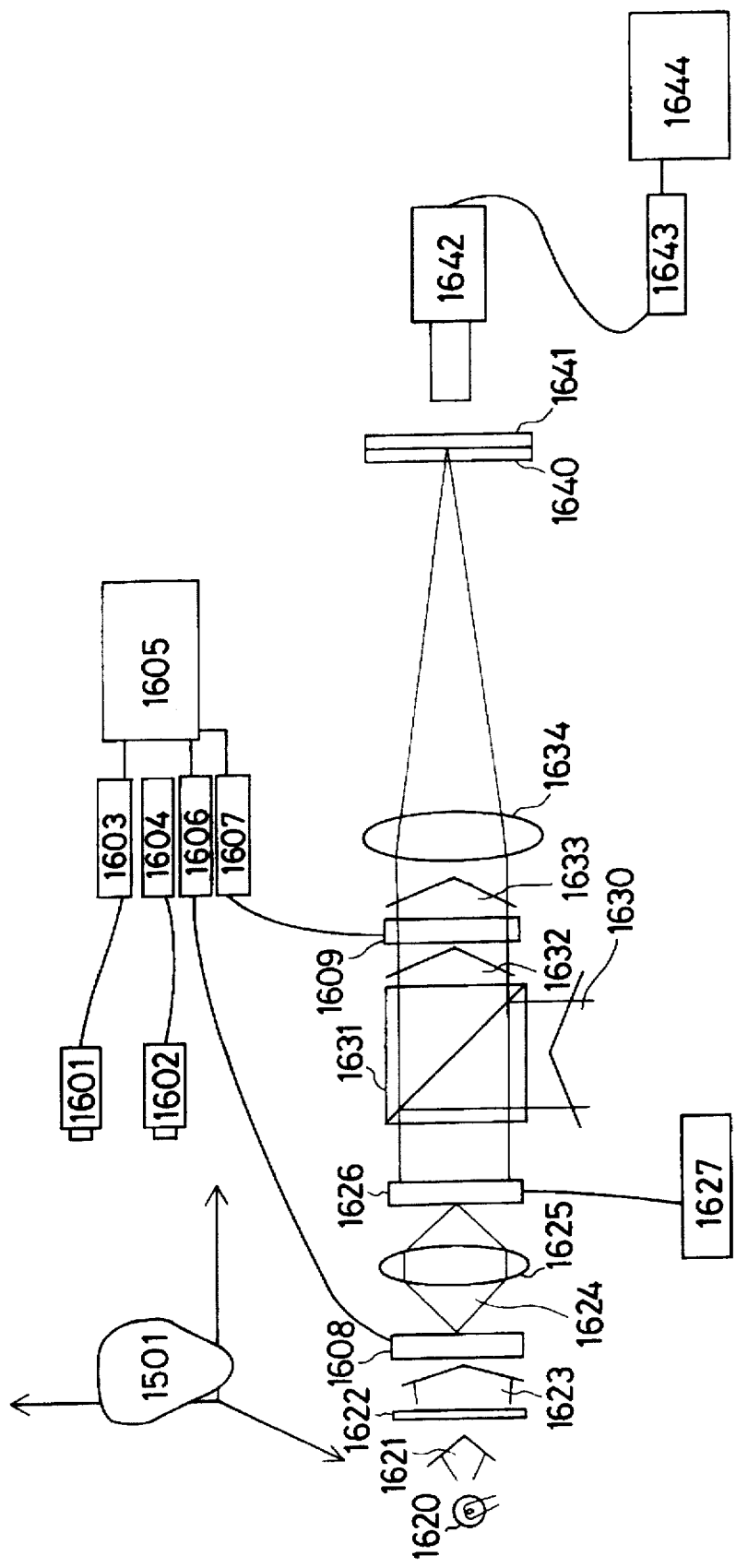
FIG. 16 shows the arrangement of an image processing apparatus according to an eighth embodiment of the present invention.

Next, an eighth embodiment of the present invention, which is a second embodiment according to the second aspect of the present invention, will be described with reference to FIG. 16. In the above-described seventh embodiment, the laser range finder 1502, which is a special device for obtaining information of high accuracy, is used in the range image obtaining device 1401 serving as the object information obtaining device 1403. In this embodiment, however, in order to realize the range image obtaining device 1401 by using devices generally employed, the device 1401 is composed of two CCD cameras 1601 and 1602 as two-dimensional imaging devices, two frame memories 1603 and 1604 which are memories combined with A/D converters, and a computer 1605. In the seventh embodiment, the electrically addressed phase modulation type liquid crystal 1506 is used in the first image display device 1402 so that the apparatus can be simplified. In the eighth embodiment, however, a phase modulation, reflection type optically addressed SLM 1626 is used as a display element which is capable of modulating the phase according to the intensity of incident light and of displaying finer pixels. As a specific example of the phase modulation, reflection type optically addressed SLM 1626, a liquid crystal SLM is employed in this embodiment. Thus, the image display device in this embodiment comprises a frame memory 1606, write light 1623, an intensity modulation type electrically addressed transmission type SLM 1608 which is a liquid crystal SLM, an imaging lens 1625, and the liquid crystal SLM 1626. The arrangement of the other part of this embodiment is basically the same as that of the seventh embodiment.

First, an object 1501 to be recognized is photographed by the two CCD cameras 1601 and 1602, which are disposed at different positions so that an appropriate disparity is produced between two images photographed by the two CCD cameras 1601 and 1602. The two images photographed by the two CCD cameras 1601 and 1602 are inputted to the computer 1605 through the frame memories 1603 and 1604. Since there is a disparity between the two images inputted to the computer 1605, the depth of the object 1501 is computed by the computer 1605 using software on the basis of the disparity between the two images, thereby obtaining a range image concerning the object 1501.

Meanwhile, region extraction is executed on the computer 1605 using software by the same method as in the seventh embodiment on the basis of the gray level images obtained by the CCD cameras 1601 and 1602 and the range image obtained therefrom. A pattern in which only the extracted region obtained by the region extraction is opened is displayed on an intensity modulation type SLM 1609 through a frame memory 1607.

Further, the range image data obtained is displayed on the SLM 1608 through the frame memory 1606, and the displayed image is read out by write light 1623 which is formed by diffusing incoherent light 1621 from an incoherent light source 1620 through a diffuser 1622. The imaging lens 1625 is disposed so that the display surface of the SLM 1608 and the write surface of the SLM 1626 are in image-forming relation to each other. Thus, read light 1624 which reads out the range image displayed on the SLM 1608 forms an image on the write surface of the SLM 1626, thereby writing the image data in the form of light intensity.

Since the SLM 1626 is an optically addressed phase modulation type SLM, phase modulation is carried out by using a controller 1627 so that the phase is $-\pi$ when the light intensity is the strongest, while the phase is $+\pi$ when the light intensity is the weakest. The image written to the SLM 1626 in the form of light intensity is read out as a phase distribution image by approximately parallel light 1630 which is applied through a beam splitter 1631. Light 1632 which is read out by the read light 1630 is then incident on the SLM 1609. Since a pattern in which only the region of the recognition object is opened is displayed on the SLM 1609, as has been described above, the light 1632 passes through only the region indicating the recognition object, and only the transmitted light 1633 passes through a Fourier transform lens 1634 and further through a filter 1640 and forms a Fourier spectrum image of the read image on a screen 1641 which is disposed on the back focal plane of the lens 1634. The filter 1640 is formed by drawing a pattern on a film so that the transmittance varies according to the position to compensate for the deviation of the apparent area from the actual surface area in the same way as in the seventh embodiment.

Data concerning the Fourier spectrum image corrected for the intensity information is taken in by a CCD camera 1642, and detected by a computer 1644 through a frame memory 1643. The detected image has a peak at a point which indicates the inclination of a plane constituting the recognition object, and the peak corresponds to the area of the plane in the same way as in the seventh embodiment. Therefore, it is possible to instantaneously detect the inclination of the equation of a plane constituting the recognition object and the surface area of the plane.

Although in the foregoing embodiments an electrically addressed phase modulation type liquid crystal and an optically addressed phase modulation type liquid crystal are used as a display element, it is also possible to use crystal, thermoplastic, semiconductor or other devices.

Further, although in the foregoing embodiments, the phase modulation range is set at $-\pi$ to $+\pi$, it may be set at $-n\pi$ to $+m\pi$ (n, m: integers). In this case also, the same effect can be obtained. Further, assuming that range information is to be phase-modulated in the range of from $-n\pi$ to $+m\pi$, if the information obtained is further converted in the range of from $-\pi$ to $+\pi$, it is possible to obtain the same effect as in a case where modulation is carried out in the range of from $-n\pi$ to $+m\pi$ even if the spatial light modulator employed is capable of modulation only in the range of from $-\pi$ to $+\pi$.

[Ninth Embodiment]

Figure 17:
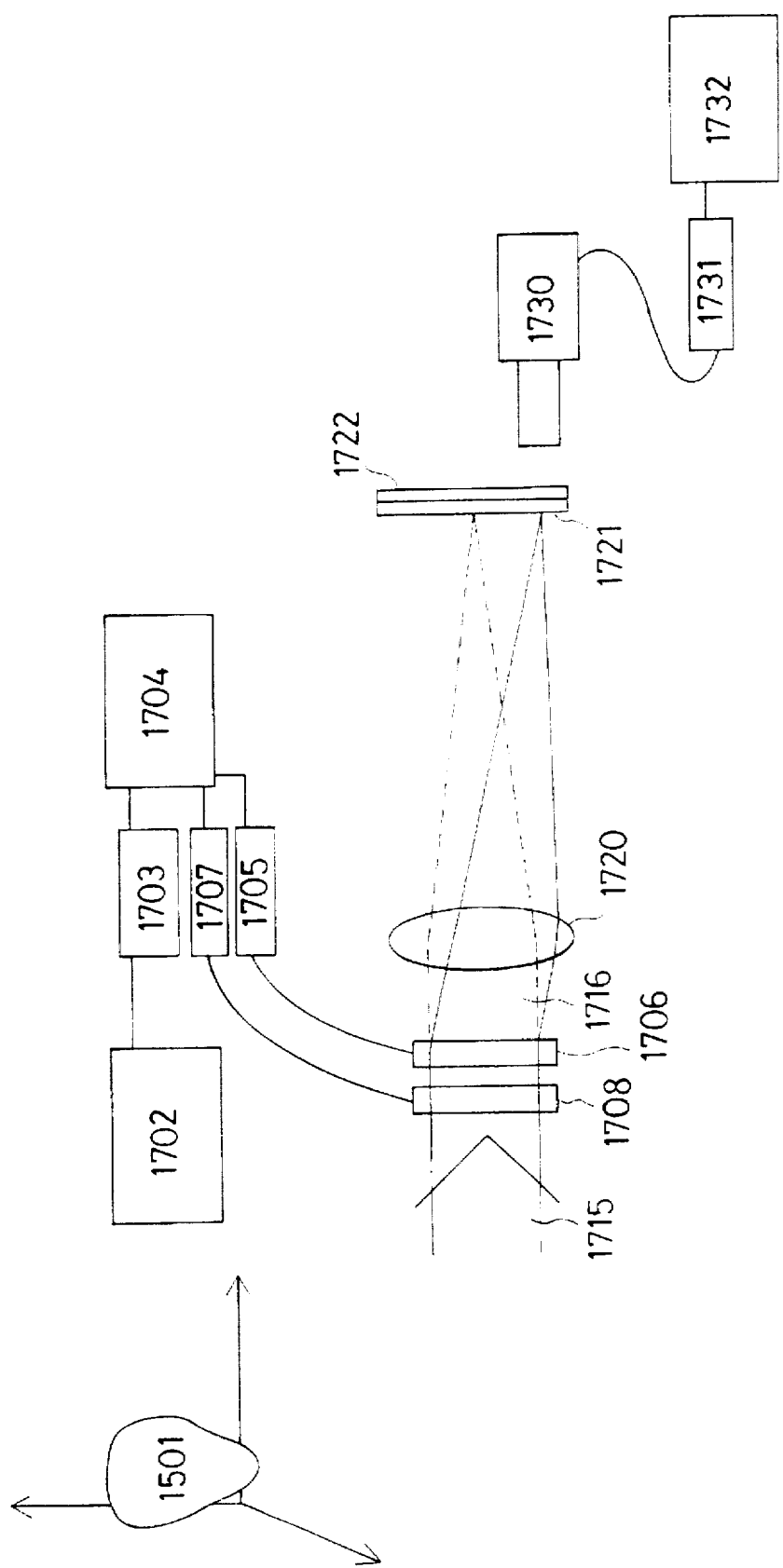
FIG. 17 shows the arrangement of an image processing apparatus according to a ninth embodiment of the present invention.

Next, a ninth embodiment of the present invention, which is a third embodiment according to the second aspect of the present invention, will be described with reference to FIG. 17. In the above-described seventh and eighth embodiments, a phase modulation type SLM is used for displaying a phase distribution as a display element in the image display device 1402. However, the phase modulation type SLM is a special device in the present state of art. In this embodiment, therefore, an intensity modulation type SLM, which is used even more generally, is employed as a display element, and a liquid crystal SLM is used as a specific example of the intensity modulation type SLM in this embodiment.

The basic arrangement of this embodiment is the same as that of the seventh embodiment. In this embodiment, however, a transmission type electrically addressed intensity modulation type SLM 1706 is used in place of the transmission type electrically addressed phase modulation type SLM 1506. As a specific example of the SLM 1706, a liquid crystal SLM is used in this embodiment. Further, the distribution of a filter 1721 for detecting a peak is made different from that in the seventh embodiment. In these points, this embodiment differs from the seventh embodiment.

First, the configuration of an object 1501 to be recognized is measured by using a laser range finder 1702 as an object information obtaining device in the same way as in the seventh embodiment. Next, the measured information is passed through a frame memory 1703, and a range image of the recognition object 1501 is obtained by a computer 1704. In the computer 1704, further, a computer generated hologram is produced on the basis of the range image z(x,y) so that one of light rays read out by read light 1715 has a wavefront of exp(iz(x,y)).

For example, as shown in FIG. 9, a wavefront R(x,y) 731 is assumed with respect to a plane 733 of z=0 in a coordinate system (x,y,z), and interference fringes between the wavefront 731 and the phase distribution exp(iz(x,y)) 732, i.e., $$L(x,y)=|e^{iz(x,y)}+R(x,y)|^2$$

are computed on the plane 733, thereby obtaining a computer generated hologram L(x,y). The computer generated hologram thus obtained is passed through a frame memory 1705, and displayed on the SLM 1706.

Meanwhile, a region indicating the recognition object is found by using software in the computer 1704 as the region extracting device 1404 on the basis of the range image obtained by the range finder 1702 in the same way as in the seventh embodiment, and an image in which light can pass through only the region of the recognition object is displayed on a liquid crystal SLM 1708.

The images displayed on the liquid crystal SLMs 1708 and 1706 are read out by using the wavefront R(x,y), which has been assumed above, as read light 1715. That is, the read light 1715 is first incident on the liquid crystal SLM 1708, where it passes only through the region indicating the recognition object, and the transmitted light is then incident on the liquid crystal SLM 1706 which is displaying the computer generated hologram. By doing so, light rays 1716 read out from the computer generated hologram within the recognition object region include one which has a wavefront of exp(iz(x,y)). The wavefront of exp(iz(x,y)) is Fourier-transformed by using a Fourier transform lens 1720, and a Fourier spectrum image that is formed on a screen 1722 through the filter 1721 is taken in by a CCD camera 1730, and detected by a computer 1732 through a frame memory 1731. The Fourier spectrum image shows the inclination of a plane constituting the object 1501 to be recognized and an approximate area of the plane in the same way as those described above. Thus, the same effects as those in the seventh and eighth embodiments are obtained.

Figure 18:
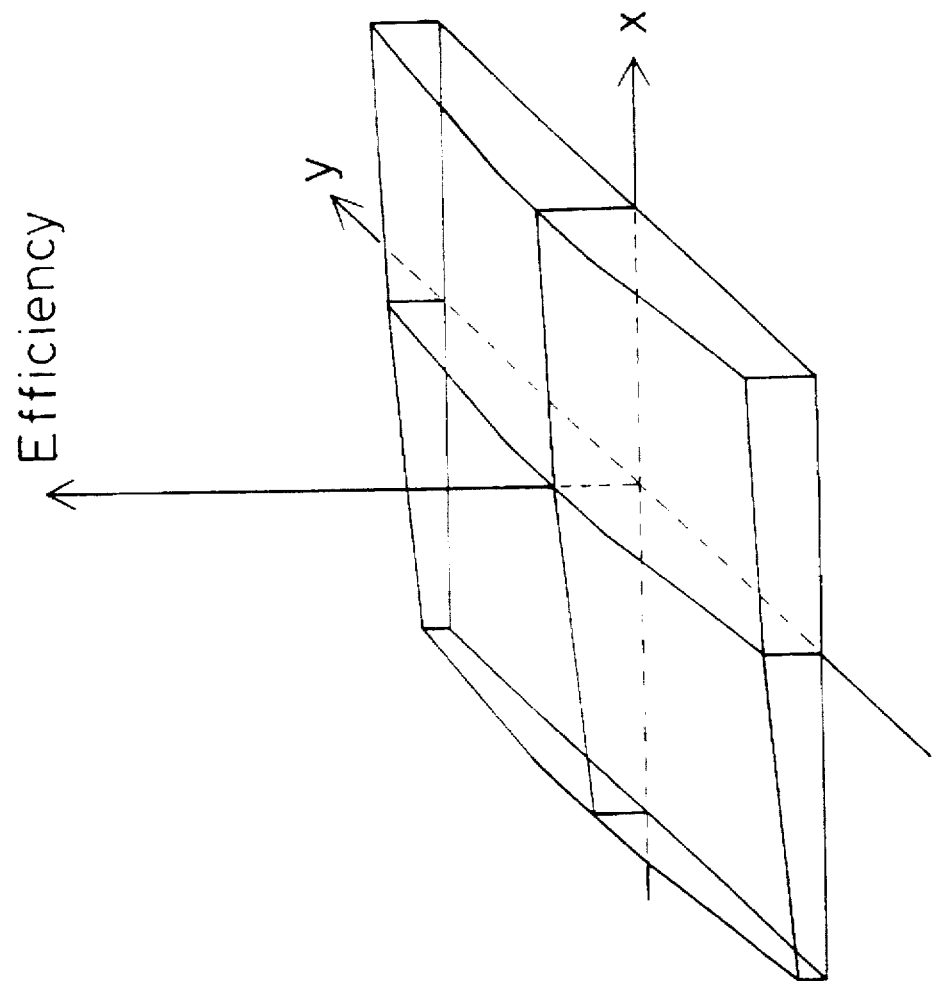
FIG. 18 schematically shows the diffraction efficiency at a predetermined position on an object to be recognized.
Figure 19:
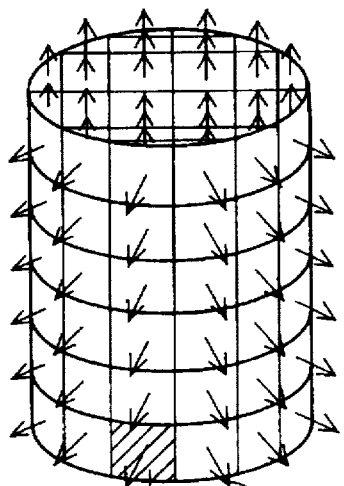
FIGS. 19(a), 19(b) and 19(c) are views for explaining a method in which an extended Gaussian sphere is used for recognition.
Figure 19:
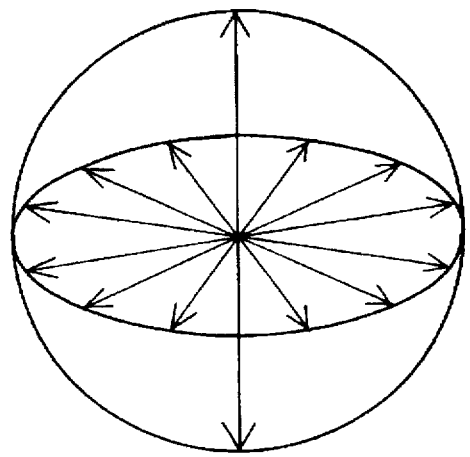
Figure 19:
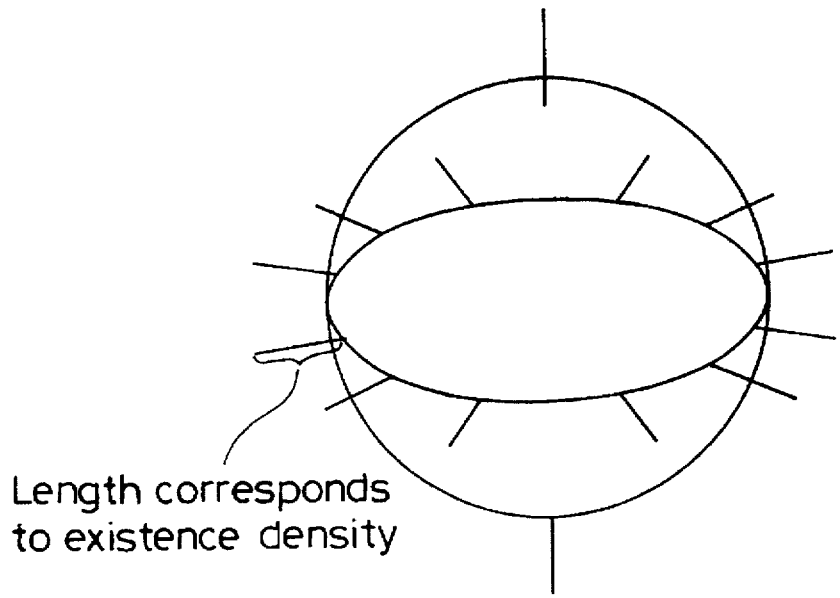
Figure 20A:
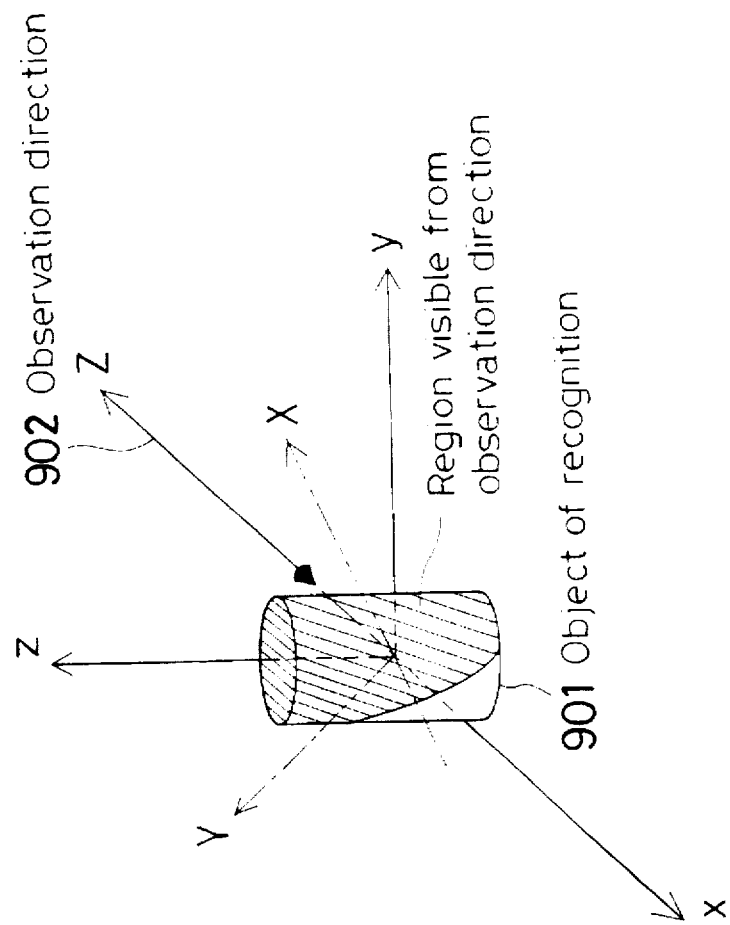
FIGS. 20(a) and 20(b) show the way in which an extended Gaussian image which is actually observable is limited.
Figure 20B:
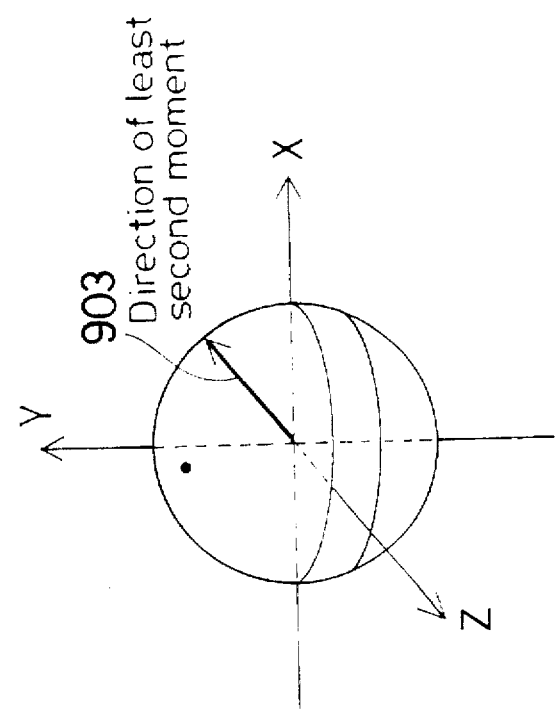

Unlike the filter 1521 in the seventh embodiment, the filter 1721 in this embodiment is designed to compensate for not only a deviation of the apparent area of the portion under observation from the actual surface area but also a reduction of the light intensity due to the diffraction efficiency, which depends on the direction of diffraction. The filter 1721 is produced as follows: Holograms which are uniform in size but different in the direction of diffraction are displayed on the SLM 1706 to measure the light intensity at the diffraction position in advance. For example, as shown in FIG. 18, if the efficiency for a certain position (x,y) is found from the light intensity at that position, transmittances for compensating for a variation of the efficiency and the above-described deviation of the apparent area from the actual surface area are obtained, and patterns corresponding to the transmittances thus obtained are drawn on a film, thereby forming the filter 1721.

In the seventh to ninth embodiments a pair of CCD cameras or a laser range finder is employed as the range image obtaining device 1401. However, it is also possible to adopt a method in which the object to be recognized is photographed from two different positions by using a single CCD camera, and a range image is obtained from two images which are obtained by the CCD camera, although the processing speed becomes slower than in the case of the above-described method. In a case where the object to be recognized moves with time, if the object is photographed twice at a certain sampling time with one fixed CCD camera, a range image can be obtained from two images thus obtained.

Although in the ninth embodiment an electrically addressed intensity modulation type liquid crystal is used as an example of a display element, it is also possible to realize the same arrangement as the above by using an optically addressed intensity modulation type liquid crystal, crystal, thermoplastic, semiconductor or other similar device.

Further, although in the foregoing embodiments a CCD camera is used as an example of a two-dimensional imaging device, it is also possible to use an image pickup tube or other solid-state image sensing device.

Further, although in the foregoing embodiments, a filter which is formed by drawing a pattern on a film is used as a filter for compensating for a deviation of the detected light intensity from the actual area, the same effect can be obtained by controlling the transmittance with a liquid crystal SLM or the like.

Although in the foregoing embodiments only a method which employs a first or second differential of the range image is shown as a region extracting method, it is also possible to adopt a method in which filtering is optically carried out, or self-organization of a neural network. Further, it is possible to employ a region dividing method which utilizes not only a range image but also a gray level image, a color image, etc.

It will also be obvious that region extraction may be carried out so as to distinguish the recognition object not only from the background but also from another object.

As has been described above, the present invention enables an image corresponding to an extended Gaussian image to be obtained at high speed, and consequently, makes it possible to recognize a three-dimensional object at high speed.

What we claim is:

1. An image processing apparatus comprising:

means for obtaining a range image as three-dimensional information about an object;

means for displaying obtained range image as a phase distribution;

a Fourier transform optical system including approximately parallel coherent light for reading out the image displayed on said image display means, and a Fourier transform lens for carrying out Fourier transformation on the image read out by said coherent light;

means for detecting a Fourier spectrum image obtained by said Fourier transform optical system;

means for storing reference data including data concerning a vector normal to a surface constituting a reference three-dimensional object which has previously been measured and data concerning an area of the reference three-dimensional object which has previously been measured; and means for recognizing an object at high speed by comparing information concerning the Fourier spectrum image obtained by said detecting means with said reference data.

2. An image processing apparatus comprising:

object information obtaining means having range image obtaining means for obtaining a range image as information concerning an object;

first image display means for displaying the range image obtained by said object information obtaining means as a phase distribution;

second image display means for dividing the object information obtained by said object information obtaining means into regions, extracting a region from said divided regions and displaying the extracted region as intensity information;

coherent light generating means for emitting approximately parallel coherent light for reading out the images displayed on said first and second image display means;

a Fourier transform optical system for carrying out Fourier transformation by condensing said approximately parallel coherent light; and detecting means for detecting a Fourier spectrum image by receiving said condensed coherent light, wherein said first image display means and said second image display means are disposed between said coherent light generating means and said Fourier transform optical system such that the images displayed on said first and second image display means are read out by said coherent light passing through said first and second image display means, said images read out by said coherent light are transformed into a Fourier spectrum image by said coherent light passing through said Fourier transform optical system, and said Fourier spectrum image is detected by said detecting means whereby a normal to a plane of an object contained in the obtained object information and an approximate area of said plane can be detected at high speed.

3. An image processing apparatus according to claim 1 or 2, wherein said detecting means includes a filter capable of intensity modulation.

4. An image processing apparatus according to claim 2, further comprising:

means for storing reference data including data concerning a vector of a normal to a surface constituting a three-dimensional object which has previously been measured, and data concerning an area of a three-dimensional object which has previously been measured; and recognition means for recognizing a three-dimensional object at high speed by comparing information concerning the Fourier spectrum image, which is obtained by said detecting means, with said reference data.

5. An image processing apparatus according to claim 1 or 4, wherein said recognition means has means for externally outputting a recognition result.

6. An image processing apparatus according to claim 5, wherein said output means has means for displaying an image.

7. An image processing apparatus according to claim 5, wherein said output means has means for outputting a sound.

8. An image processing apparatus according to claim 5, wherein said output means has means for turning on a lamp.

9. An image processing apparatus according to claim 5, wherein said output means has means for recording a recognition result on a recording medium.

10. An image processing apparatus according to claim 1 or 2, wherein said image display means for displaying the obtained range image as a phase distribution has phase converting means in which the phase distribution is variable in a range of $2m\pi$ (m is a natural number).

11. An image processing apparatus according to claim 1 or 2, wherein said image display means for displaying the obtained range image as a phase distribution has a spatial light modulator having a phase modulating function.

12. An image processing apparatus according to claim 1 or 2, wherein said image display means for displaying the obtained range image as a phase distribution has a hologram.

13. An image processing apparatus according to claim 1 or 4, wherein said recognition means includes:

reference data means for storing reference data such as a normal to a plane contained in a range image of an object, and an approximate area of said plane; and data comparing means for making comparison between said reference data and data such as a normal to a plane contained in the range image, which is obtained by said detecting means, and an approximate area of said plane.

14. An image processing apparatus according to claim 1 or 4, wherein said recognition means determines whether or not said reference data and the object to be recognized are identical with each other.

15. An image processing apparatus according to claim 1 or 4, wherein said recognition means determines which direction the object to be recognized faces by comparing said object to be recognized with said reference data.

16. An image processing apparatus according to claim 1, wherein the reference data in said reference data sorting means is an extended Gaussian image of the reference three-dimensional object which has previously been measured.

17. An image processing apparatus according to claim 4, wherein the reference data in said reference data storing means is an extended Gaussian image of the reference three-dimensional object which has previously been measured.

\* \* \* \* \*